(12) United States Patent
Olde Scheper et al.

(10) Patent No.: US 9,740,180 B2
(45) Date of Patent: Aug. 22, 2017

(54) METHOD OF CONTROLLING A DYNAMIC PHYSICAL SYSTEM THAT EXHIBITS A CHAOTIC BEHAVIOUR

(71) Applicant: Oxford Brookes University, Oxford (GB)

(72) Inventors: Tjeerd Victor Siebe Maria Olde Scheper, Oxford (GB); Andrew Robert Carnell, Oxford (GB)

(73) Assignee: OXFORD BROOKES UNIVERSITY, Oxford (GB)

( * ) Notice: Subject to any disclaimer, the term of this patent is extended or adjusted under 35 U.S.C. 154(b) by 548 days.

(21) Appl. No.: 14/356,110

(22) PCT Filed: Nov. 5, 2012

(86) PCT No.: PCT/GB2012/052739
§ 371 (c)(1),
(2) Date: May 2, 2014

(87) PCT Pub. No.: WO2013/064840
PCT Pub. Date: May 10, 2013

(65) Prior Publication Data
US 2014/0309755 A1    Oct. 16, 2014

(30) Foreign Application Priority Data
Nov. 3, 2011 (GB) .................................. 1119036.0

(51) Int. Cl.
*G05B 13/02* (2006.01)
*G05B 13/04* (2006.01)
(Continued)

(52) U.S. Cl.
CPC ......... *G05B 13/04* (2013.01); *F02D 41/0002* (2013.01); *F03D 7/00* (2013.01); *F24F 11/0009* (2013.01); *G05B 13/047* (2013.01)

(58) Field of Classification Search
None
See application file for complete search history.

(56) References Cited

U.S. PATENT DOCUMENTS 4,557,106 A * 12/1985 Ffowcs Williams ..... F02C 9/34
431/1
7,616,304 B2 * 11/2009 Gankkhanov ............. G01J 3/10
356/301

(Continued)

OTHER PUBLICATIONS

T olde Scheper, "Why metabolic systems are rarely chaotic", Biosystems vol. 94, Oct. 1, 2008 (North-Holland, Amsterdam, NL), pp. 145-27 152.

(Continued)

*Primary Examiner* — Philip Wang
(74) *Attorney, Agent, or Firm* — Lathrop & Gage LLP

(57) ABSTRACT

A method of controlling a dynamic physical system comprising a plurality of variable quantities. A model of the system comprising a plurality of variables representing the variable quantities, and a plurality of respective rate equations that describe the rate of change of the variables, is obtained. A control term in at least one rate equation from the plurality of rate equations is identified. A rate control function is derived from, for at least one of the variables in the rate equation, the proportion of the variable to the growth rate of the rate equation, and the rate control function is applied to the control term to provide a stabilized control term. The dynamic physical system is then controlled by modifying at least one of the quantities represented by the variables in the control term, so that the control term derived from the modified quantities is substantially the same as the stabilized control term.

26 Claims, 17 Drawing Sheets

(51) Int. Cl.
  *F02D 41/00* (2006.01)
  *F03D 7/00* (2006.01)
  *F24F 11/00* (2006.01)

(56) References Cited

U.S. PATENT DOCUMENTS

| | | | | |
|---|---|---|---|---|
| 2003/0056753 | A1* | 3/2003 | Fukushima | F02D 31/002 123/335 |
| 2003/0140617 | A1* | 7/2003 | Yasui | F02D 41/1403 60/276 |
| 2004/0193358 | A1* | 9/2004 | Yasui | F01N 9/005 701/109 |
| 2006/0165138 | A1* | 7/2006 | Kachanov | H01S 5/02248 372/21 |
| 2008/0277486 | A1* | 11/2008 | Seem | F24F 11/0009 236/49.3 |
| 2009/0113896 | A1* | 5/2009 | Fukuda | F02C 9/18 60/784 |
| 2011/0049885 | A1* | 3/2011 | Hernandez Mascarell | F03D 7/0224 290/44 |
| 2012/0323343 | A1* | 12/2012 | Grichnik | G05B 23/0235 700/30 |
| 2014/0004585 | A1* | 1/2014 | Oliveira | C12P 7/06 435/161 |

OTHER PUBLICATIONS

GB Application 1119036.0 Search Report dated Jan. 26, 2012, 1 page.
Ataei, et al., "Control of chaos in 1-52 permanent magnet synchronous motor by using optimal Lyapunov exponents placement" Physics Letters A. North-Holland Publishing Co. Amsterdam. NL. vol. 374. No. 41. Sep. 13, 2010 (Sep. 13, 2010). pp. 4226-4230.
Yazdanpanah, et al., "Adaptive control of chaos in nonlinear chaotic discrete-time systems," Physics and Control. 2005. Proceedings 2005 International Conference Saint Petersburg. Russia Aug. 24-26, 2005. Piscataway. NJ. USA.IEEE. Aug. 24, 2005 (Aug. 24, 2005). pp. 913-915.
Wu, et al., "Non-feedback Control on Chaotic Logistic System," Information Processing. 2009. APCIP 2009. Asia-Pacific Conference on IEEE Piscataway. NJ. USA. Jul. 18, 2009 (Jul. 18, 2009). pp. 215-217.
Ohtsubo, "Feedback Induced Instability and Chaos in Semiconductor Lasers and Their Applications," Optical Review. Springer. Berlin. DE. vol. 6. No. 1. Jan. 1, 1999 (Jan. 1, 1999) pp. 1-15.
Fradkov, et al., "Control of chaos: Methods and applications in engineering," Annual Reviews in Control. Pergamon. Amsterdam. NL. vo 1 • 29. No. 1. Jan. 1, 2005 (Jan. 1, 2005). pp. 33-56.
Abashar, et al., "Dynamic and chaotic behavior of periodically forced fermentors for bioethanol productions," Chemical Engineering Science 65, 4894-4905, 2010.
Henson, "Exploiting cellular biology to manufacture high-value products," IEEE Control Systems Magazine, 54-62, Aug. 2006.

* cited by examiner

METHOD OF CONTROLLING A DYNAMIC PHYSICAL SYSTEM THAT EXHIBITS A CHAOTIC BEHAVIOUR

FIELD OF THE INVENTION

The present invention concerns the control of dynamic physical systems. More particularly, but not exclusively, the invention concerns the control of dynamic physical systems that exhibit chaotic behaviour.

BACKGROUND OF THE INVENTION

Chaotic dynamic physical systems are dynamic physical systems that exhibit behaviour that is deterministic in a mathematical sense (the behaviour is precisely determined by the state at any particular time), but nevertheless unpredictable over time due to the sensitivity of the system on the state. Due to this unpredictability, when attempting to control a dynamic physical system it is generally considered undesirable to allow it to enter a chaotic state, as this limits the ability to control the system.

However, avoiding chaotic states may mean restricting the system to inefficient states. For example, in a chemical reaction, while they are unpredictable the chaotic states may make use of resources more efficiently than the stable, non-chaotic states. Further, in systems beyond a certain size chaotic behaviour may be inevitable, and so chaotic behaviour can be avoided only by restricting to very small-scale systems. For this reason, the control of chaotic systems has been of some interest.

A dynamic physical system can be represented by a plurality of variables, each representing a quantity of the system that varies over time. (For example, if the system is a chemical process, the variables could represent the quantities of the different chemicals or their concentrations.) The system can then be modelled by a plurality of rate equations for each of the variables, which describe how the quantities vary over time based on the current state.

As is well known, the instantaneous state of a system can be considered to be a point moving around a "state space", where the dimensions of the state space represent the different variables of the system, and the position of the point at a given time is determined by the values of the variables at that time. The state of an example Rössler system (a well-known simple dynamic physical system that exhibits chaotic behaviour) as a point moving through state space is shown in FIG. 1.

It is known that for dynamic physical systems in ranges where chaotic behaviour occurs, the global behaviour of the system is dominated by a subset of the rate equations, which tend to be the non-linear parts of the system that allow the quantities of the system to grow at an exponential rate. The local rate of expansion is proportional to the local behaviour of each of the variables.

A known method of controlling a chaotic system is the OGY (Ott, Grebogi and Yorke) method, as first described in E. Ott, C. Grebogi, and J. A. Yorke, "Controlling chaos", Phys. Rev. Lett. 64 1196 (1990). The OGY model is based upon the properties of chaotic systems discussed above. In the OGY method, a model of the dynamic physical system is obtained, and analysed to identify an unstable periodic orbit around which the system cycles is identified. The system is then controlled by applying small, pre-determined changes to the variables of the system, in proportion to the local behaviour of the variables, in order to keep the system in or near the chosen orbit.

Another known method of controlling a chaotic system is the Pyragas continuous control method. Similarly to the OGY method, an unstable periodic orbit around which the system cycles is identified. However, in this method adjustments are made to the system in accordance with pre-determined time delays, which need to be carefully matched with the dynamics of the system to allow successful control.

It is a disadvantage of the both OGY method and the Pyragas method that they require the system in operation to be analysed in order to identify a particular unstable periodic orbit, so that the properties of that orbit can be used to implement the method. Further, neither method allows control of systems in all cases.

The present invention seeks to mitigate the above-mentioned problems. Alternatively or additionally, the present invention seeks to provide an improved method of controlling a dynamic physical system, in particular a dynamic physical system that exhibits chaotic behaviour.

SUMMARY OF THE INVENTION

In accordance with a first aspect of the invention there is provided a method of controlling a dynamic physical system, wherein the system comprises a plurality of variable quantities, the method comprising the steps of:

obtaining a model of the system, the model comprising a plurality of variables representing the variable quantities, and a plurality of respective rate equations that describe the rate of change of the variables;

identifying a control term in at least one rate equation from the plurality of rate equations;

deriving a rate control function from, for at least one of the variables in the rate equation, the proportion of the variable to the growth rate of the rate equation;

applying the rate control function to the control term to provide a stabilised control term; and controlling the dynamic physical system by modifying at least one of the quantities represented by the variables in the control term, so that the control term derived from the modified quantities is substantially the same as the stabilised control term.

The control term is a term that in at least some states of the system dominates the control of the variable whose behaviour is defined by the rate equation. As discussed above, in ranges where chaotic behaviour occurs, the local rate of expansion of a variable is proportional to the local behaviour of the variables in the control term. The rate control function is derived from the proportions of the variables, and so acts to stabilise the rate equation. The stabilisation of the model given by the rate control function can be applied to the system itself by modifying the quantities represented by the variables accordingly, thus allowing the system to be stabilised. The control term will in most cases be a term that would under certain conditions expand exponentially if the control provided by the invention were not applied.

Unlike the known methods described above, the method of this aspect of the invention does not require the model to be analysed when in operation, so that the properties of a particular unstable orbit can be identified. Rather, only the rate equations defining the model need to be considered, so that the rate control equation can be derived.

Preferably, the control term includes the variable whose behaviour is described by the rate equation. Such a term usually allows exponential expansion of the system, as the feedback of the value of the variable on its own growth rate is what causes the exponential growth.

Preferably, the proportion $q_x$ of a variable x to the growth rate is given by the equation:

$$q_x = \frac{x}{x + \mu_x}$$

where $\mu_x$ is a constant. Preferably again, the rate control function is of the form:

$$f_e^\xi q_{x1} \cdots q_{xn}$$

where $q_{x1}$ to $q_{xn}$ are the proportions of the variables $x_1$ to $x_n$ to the growth rate, and f and $\xi$ are scalars. The scalars may f and $\xi$ may advantageously be varied so as to stabilise the system into a pre-determined chosen orbit. The rate control function may include a biasing term, in the form of a constant term added to the original rate control function above.

Preferably, the at least one rate equation describes exponential growth of its respective variable. This is because a rate equation allowing exponential growth will tend to dominate the behaviour of the system in at least some ranges. Preferably, the control term contributes to the growth of the respective variable of the at least one rate equation.

The method is preferably implemented using a computer or computing device. Alternatively the method may be implemented using an electronic circuit. The dynamical physical system may be controlled by a control system, which preferably comprises a computer or computing device. Alternatively the control system may comprise an electronic circuit. The control system preferably measures one or more quantities of the system using one or more input devices, sensors or the like. The values of quantities of the system may be calculated by the control system from the measurements. The control system may calculate the modification required to the controlled quantity of the system, and modify the quantity using one or more control devices.

In accordance with a second aspect of the invention there is provided a dynamic physical system controlled according to any of the methods described above. The dynamical physical system may comprise a control system, which preferably comprises a computer or computing device. Alternatively the control system may comprise an electronic circuit. The control system may be arranged to measure one or more quantities of the system using one or more input devices, sensors or the like. The control system may be arranged to calculated values of quantities of the system from the measurements. The control system may be arranged to calculate the modification required to the controlled quantity of the system, and to modify the quantity using one or more control devices.

In the first aspect of the invention, the dynamic physical system may be a bioreactor. The bioreactor may be a bioethanol fermentor. Advantageously, the control term is $D(C_{sf} - C_s)$, where $C_s$ is the substrate concentration, $C_{sf}$ is a forcing term, and D is a constant. In such a case, preferably the rate control function is:

$$\sigma(C_s) = f_s e^{\xi q_{C_s}}$$

where:

$$q_{C_s} = \frac{C_s}{C_s + \mu_1}$$

Alternatively, the control term may be $-DC_p$, where $C_p$ is the product concentration and D is a constant. This allows the system to be controlled by controlling the concentration of the product, or in other words by removing the product from the system as it is produced. In such a case, preferably the rate control function is:

$$\sigma(C_p) = f_s e^{\xi q_{C_x} C_e}$$

where:

$$q_{C_x} = \frac{C_x}{C_x + \mu_2}$$

$$q_{C_e} = \frac{C_e}{C_e + \mu_3}$$

$C_x$ is the biomass concentration and $C_e$ is the active component fraction.

In accordance with a third aspect of the invention there is provided a bioreactor controlled according to any of the methods described above.

In accordance with a fourth aspect of the invention there is provided a bioethanol fermentor controlled according to any of the methods described above.

In the first aspect of the invention, the dynamic physical system may be a wind turbine. Preferably the wind turbine is controlled by varying the pitch of the blades of the turbine. Advantageously, the control term is $T_r$, the aerodynamic torque of the wind turbine. In that case, he rate control function may be:

$$\sigma_{\omega_r}(q_{T_r}) = f \cdot e^{(\xi(q_{T_r}))}$$

where:

$$q_{T_r} = \frac{T_r}{T_r + \mu_{T_r}}$$

The control term may be the wind speed. Alternatively, the control term may be the power output of the turbine generator. The wind turbine may be controlled by a control function that is a combination of a control functions derived from control terms for the wind speed and the power output of the turbine generator respectively.

The wind turbine may be controlled by controlling the torque of the power generator of the wind turbine. Alternatively and/or additionally, the wind turbine may be controlled by controlling the angular velocity of the power generator of the wind turbine. The control term may be the angular velocity of the rotational input of the power generator. Alternatively and/or additionally, the control term may be the torque of the rotational input of the power generator.

In accordance with a fifth aspect of the invention there is provided a wind turbine controlled according to any of the methods described above.

In the first aspect of the invention, the dynamic physical system may be an HVAC system. The control term may be the volumetric flow-rate $\dot{v}_e$ of the exhaust air. In that case, the rate control function may be:

$$\sigma_T(q_{\dot{v}_e}) = f_T \cdot e^{(-\xi_T(q_{\dot{v}_e}))}$$

where:

$$q_{\dot{v}_e} = \frac{\dot{v}_e}{(\dot{v}_e + \mu_{\dot{v}_e})}$$

Alternatively, the control term may be the volumetric flow-rate $\dot{v}_e$ of the conditioned supply air. In that case, the rate control function may be:

$$\sigma_P(q_{\dot{v}_s}) = f_P \cdot e^{(-\xi_P(q_{\dot{v}_s}))}$$

where:

$$q_{\dot{v}_s} = \frac{\dot{v}_s}{(\dot{v}_s + \mu_{\dot{v}_s})}.$$

In the first aspect of the invention, the dynamic physical system may be a semiconductor laser system. The semiconductor laser system may be of a non-linear laser ring cavity type. Advantageously, the control term may be the amount of dissipation within the cavity. Alternatively, the semiconductor laser system may be a laser operating with delayed optical feedback. Advantageously, the control term may be the feedback strength of the system. The semiconductor laser system may be a physical optoelectronic device with a feedback loop. Advantageously, the control term may be the voltage at the output of the low-pass filter.

In accordance with a sixth aspect of the invention there is provided a laser system controlled according to any of the methods described above.

In accordance with a seventh aspect of the invention there is provided a non-linear laser ring cavity laser system controlled according to any of the methods described above.

In accordance with an eight aspect of the invention there is provided a laser operating with delayed optical feedback according to any of the methods described above.

In accordance with an ninth aspect of the invention there is provided a physical optoelectronic device laser system with a feedback loop according to any of the methods described above.

In the first aspect of the invention, the dynamic physical system may be an internal combustion engine.

The internal combustion engine may be controlled by controlling the pressure of the air intake of a cylinder of the internal combustion engine. In that case, the control term may be the drive-side torque acting against crankshaft rotation. Alternatively, the control term may be the crankshaft angular velocity of the internal combustion engine. Advantageously, both the torque of the cylinder against the rotation of the crankshaft and the crankshaft angular velocity are control terms.

Alternatively or additionally, the internal combustion engine may be controlled by controlling the pressure of the fuel injection line of a cylinder of the internal combustion engine. In that case, the control term may be the mass of oxygen in the cylinder.

Alternatively, the control term may be the pressure of the exhaust chamber of the internal combustion engine. Alternatively, the control term may be the mass of fuel in a cylinder of the engine. Alternatively, the control term may be the ignition time of a cylinder of the engine.

In accordance with a tenth aspect of the invention there is provided an internal combustion engine controlled according to any of the methods described above. The internal combustion engine may be controlled by controlling the operation at least two cylinders of the internal combustion engine. Advantageously, the at least two cylinders are controlled using different control terms.

DESCRIPTION OF THE DRAWINGS

Embodiments of the present invention will now be described by way of example only, with reference to the accompanying schematic drawings of which.

DETAILED DESCRIPTION

Figure 1:
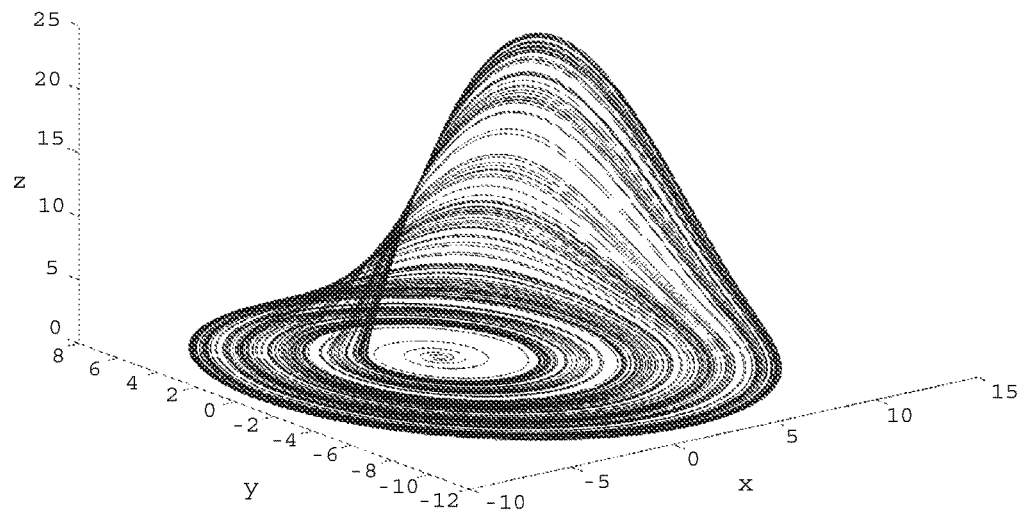
FIG. 1 is a graph showing the behaviour of a Rössler system.
Figure 2:
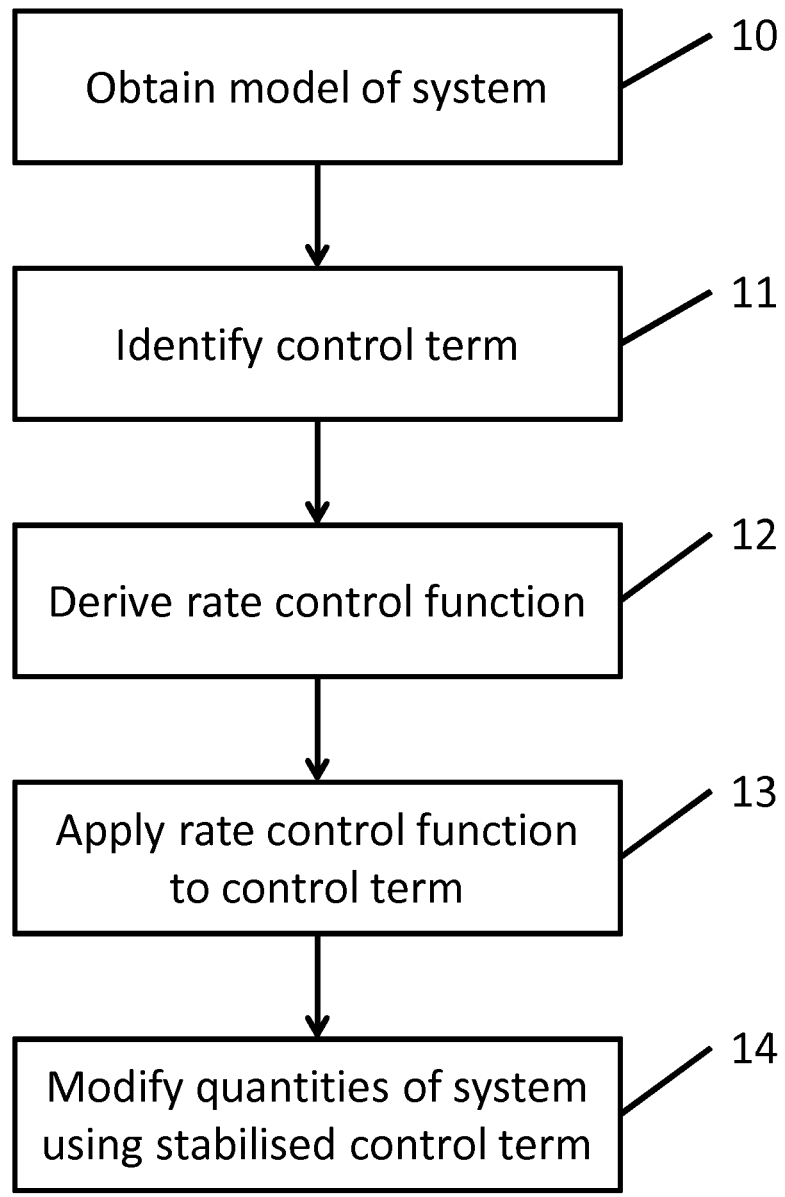
FIG. 2 is a flowchart describing the method of a first embodiment of the invention.
Figure 3A:
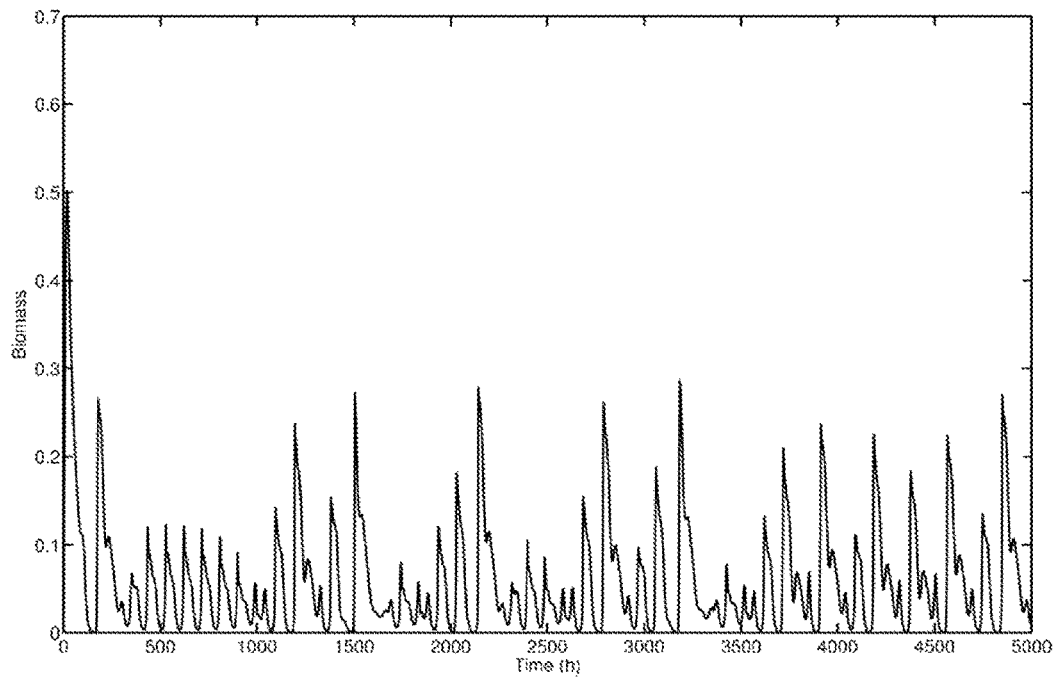
FIG. 3a is a graph showing the change over time in the biomass concentration in a conventional bioethanol fermentor.
Figure 3B:
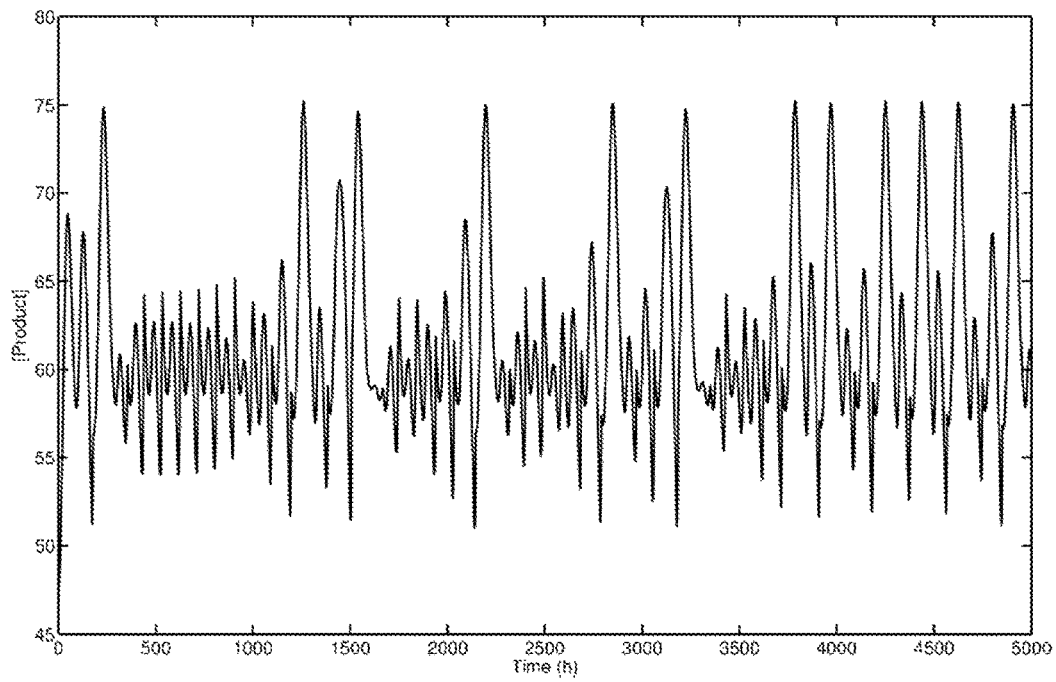
FIG. 3b is a graph showing the change over time in the product concentration.
Figure 3C:
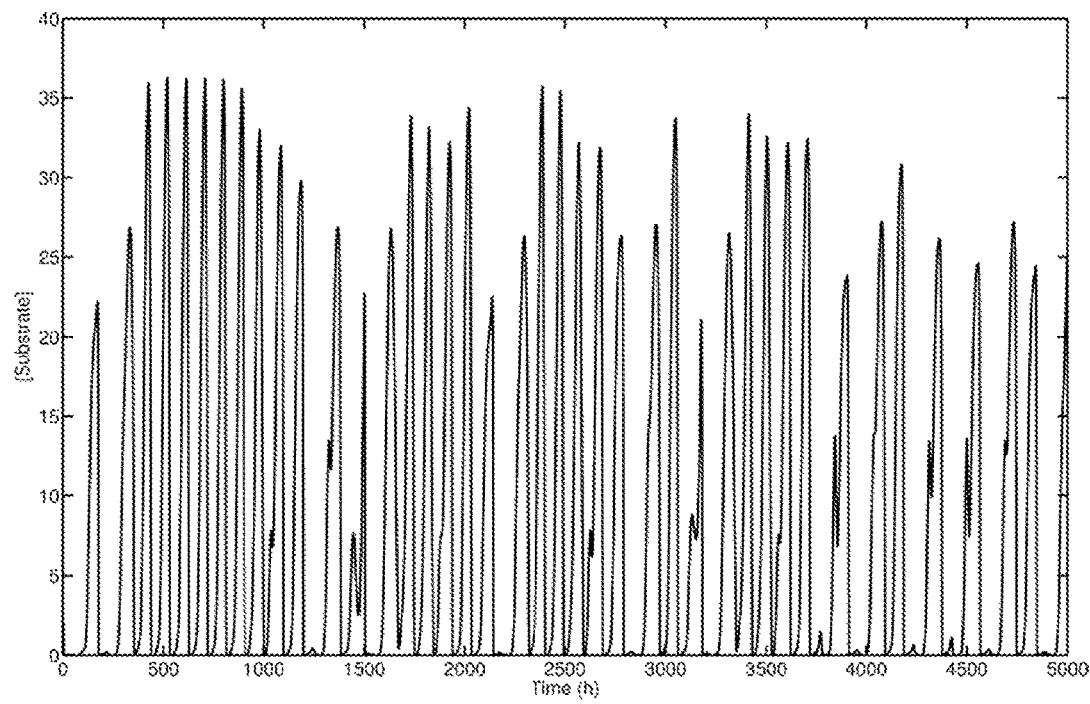
FIG. 3c is a graph showing the change over time in the substrate concentration.
Figure 3D:
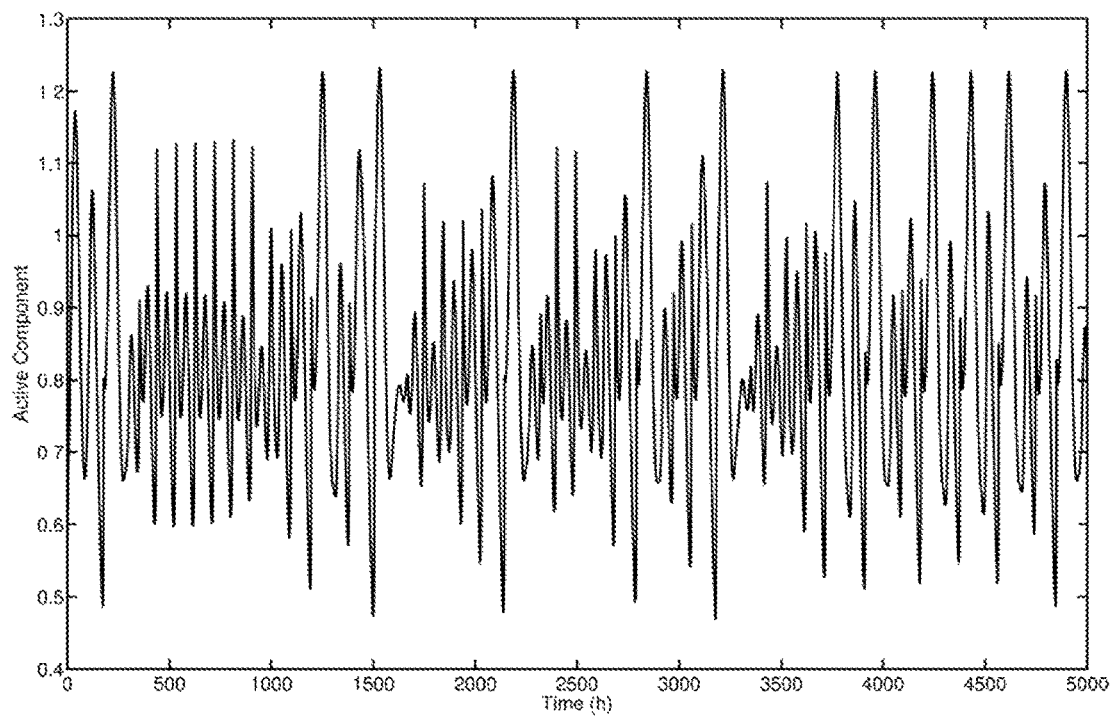
FIG. 3d is a graph showing the change over time in the active component concentration.

A first embodiment of a method of the present invention is now described with reference to the flow chart of FIG. 2. In the present embodiment, the method is being used to control a dynamic physical system comprising a set of variable quantities.

First, a model for the system is obtained (step 10). The system is modelled by a set of variables that represent the variable quantities of the system, and the model comprises a set of rate equations for the variables that describe the rate of change of the quantities based on its current state. The model may be obtained, for example, by studying the system to derive its properties, in other words deriving the model from the observed properties of the system. Alternatively, the system may already have been studied and so a model is already available.

Next, a control term for at least one of the rate equations is identified (step 11). As described above in relation to known methods of controlling chaotic behaviour, in chaotic states the global behaviour of a system tends to be dominated by non-linear parts of the system that allow quantities grow at an exponential rate. This implies that the growth of a variable in such a state will often be determined by a term including the variable itself, as this feedback of the value of the variable on its own growth rate causes the exponential growth. Thus, a control term for a rate equation for a particular variable will often be a term of the equation that includes the variable itself. However, it is not necessary (or even desirable) that the control term contains the particular variable; the control term can be any term within the rate equation that is liable to expand at an exponential rate.

A rate control function is then derived from the rate equation (step 12). In particular, the rate control function is derived using the proportions of the variables that contribute to the growth rate of the rate equation. This is because, again as discussed above in relation to known methods of control of chaos, the local rate of expansion is proportional to the local behaviour of each of the variables.

The rate control function is then applied to the control term (step 13). This provides a stabilised control term for the rate equation, in which the rate control function limits the control term in proportion to the divergence rate of the variable. Thus, if the model of the system is modified by using the stabilised control term in place of the original control term, this should give a model in which the system is stabilised.

In some embodiments the rate control function may depend on one or more scalars. A scalar may apply to the rate control function as a whole, in which case it simply defines the strength of the control applied to the system. The scalar must not be too small, in which case the control is not sufficient to prevent exponential growth, or too large, in which case it would materially affect the overall behaviour of the system (for example by preventing chaotic behaviour altogether). A suitable value for such a scalar may be determined experimentally, for example; any value that acts to keep the system stable is sufficient.

Alternatively or additionally, a scalar may apply only to the proportions of the variables in the rate control function, and not to the rate control function as a whole. Such a scalar will have a more precise effect on the behaviour of the rate control function beyond simply determining whether it successfully stabilises the system or not. For example, by varying the scalar it may be possible to select different orbits into which the system can be stabilised. Similarly to above, a suitable value for such a scalar may be determined experimentally. In practice, a scalar applied to the rate control function as a whole may need to be adjusted to take account of different values for a scalar applied to the proportions only.

Thus, a stabilised model of the system has been provided. In order to stabilise the system itself, the quantities whose variables are present in the control term are adjusted so that the control term derived from the modified quantities is the same (or at least substantially the same) as the stabilised control term (step 14). In other words, the rate control function identifies what the result of calculating the control term using the values of the quantities should be in order to stabilise the system, and thus gives a result which the quantities should be varied so as to achieve.

To give a simple example, if a growth term consists of a single variable x, and at a given point in time the rate control function has a value of 0.5, this indicates that the quantity represented by the variable x should be reduced by one half in order to keep the system stable. If on the other hand the growth term comprises more than one variable, the quantities they represent can be varied in any suitable way such that the rate control function is satisfied. This means that the quantity that is most easily to adjust can be varied, for example.

Example 1

An embodiment in which the method of the invention is applied to an example system is now described. The system is the Rössler system, a well-known dynamic physical system that exhibits chaotic behaviour, which is defined by the following rate equations:

$$\frac{dx}{dt} = -(y+z)$$

$$\frac{dy}{dt} = x + \frac{y}{\alpha}$$

-continued $$\frac{dz}{dt} = \frac{\beta}{\alpha} + (zx) - (\gamma z)$$

Considering third rate equation for the variable z, the growth of the variable z is given by the terms zx and $\beta/\alpha$, and so the control term is taken to be the term zx (as the constant term $\beta/\alpha$ cannot be varied). The proportion of each variable in the control term, to the growth rate is given by the quotients:

$$q_x = \frac{x}{x + \mu_x} \text{ and } q_z = \frac{z}{z + \mu_z}$$

where $u_x$ and $u_z$ are constants.

These quotients are then used to derive a rate control function $\sigma$ for the variable z, as follows:

$$\sigma(x, z) = f e^{\xi \cdot q_x q_z} = f e^{\left\{\frac{\xi(xz)}{(xz+x+z+\mu)}\right\}}$$

where f and $\xi$ are scalars as discussed above. (The scalar f is used to set the overall level of control applied to the system, while the scalar $\xi$ is used to stabilise the system to different orbits.)

The rate control functions are then applied to the control term in rate equation, to give the following modified control term:

$\sigma(x,z)zx$ which can be substituted in the rate equation as follows:

$$\frac{dz}{dt} = \frac{\beta}{\alpha} + (\sigma(x, z)zx) - (\gamma z)$$

This gives a stabilised system, and as described above the rate control function together with the control term defines a target for varying the quantities represented by z and x in order to stabilise the system.

Example 2

An embodiment in which the method of the invention is applied to a bioreactor is now described; that is, a biochemical process to manufacture a desired product by means of a biochemical reaction. Bioreactors and generic models thereof are described in Michael A. Henson. Exploiting cellular biology to manufacture high-value products. IEEE Control Systems Magazine, pages 54-62, August 2006.

In particular, the method of the invention as applied to a bioethanol fermentor is now described. A bioethanol fermentor is a system that produces ethanol by fermenting biomass such as waste agricultural material (sugar, fruit, grains, potatoes etc.). The biomass is fermented using a microorganism such as *Zymomonas mobilis*. A bioethanol fermentor is described in I. M. Jöbses, G. T. Egberts, K. C. Luyben, and J. A. Roels, "Fermentation kinetics of *Zymomonas mobilis* at high ethanol concentrations: Oscillations in continuous cultures", Biotechnology and Bioengineering, 28(6):868-877, 1986. Also described therein is a model of the bioethanol fermentor. Similarly, a bioethanol fermentor and its model are described in M. E. E. Abashar and S. S. E. H. Elnashaie, "Dynamic and chaotic behavior of periodically forced fermentors for bioethanol production. Chemical Engineering Science", 65(16):4894-4905, 15 Aug. 2010. However, in this case the model of the bioethanol fermentor includes a sinusoidal forcing term, which describes a periodic adjustment to one of the quantities of the system, as described below.

A model of the system with forcing term is given by the following rate equations:

$$\frac{dC_e}{dt} = \frac{C_s C_e}{K_s + C_s}(k_1 - k_2 C_p + k_3 C_p^2) - DC_e$$

$$\frac{dC_p}{dt} = C_x \left(\frac{C_e \mu}{Y_{px}} + m_p\right) - DC_p$$

$$\frac{dC_s}{dt} = D(C_{sf} - C_s) - \left(\frac{C_e \mu}{Y_{sx}}\right) - m_s C_x$$

$$\frac{dC_x}{dt} = C_x(C_e \mu - D)$$

for the active component concentration $C_e$, the product concentration $C_p$, the substrate concentration $C_s$, and the biomass concentration $C_x$ of the system. $\mu$ is the specific growth rate of the system, given by the equation:

$$\mu = \frac{\mu_{max} C_s}{K_s + C_s}$$

where $\mu_{max}$ and $K_s$ are constants. $C_{sf}$ is the forcing term, the periodic feed concentration given by the equation:

$C_{sf} = C_{s0} + A \sin(\omega t)$ where $C_{s0}$, A and $\omega$ are constants and t is time. A defines the amount of forcing applied, and $\omega$ the frequency of the forcing. (A model of the unforced system can be obtained by simply setting A to zero.) The other values in the equations are constants.

Figure 4:
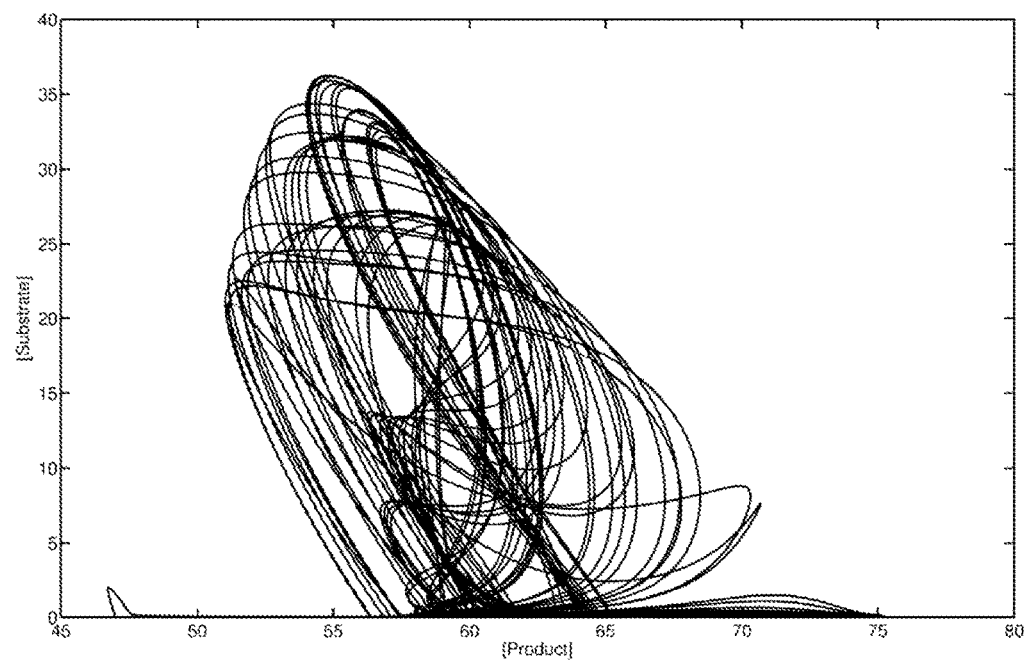
FIG. 4 is a graph showing the substrate concentration against the product concentration in the bioethanol fermentor.

An example of the chaotic behaviour of the system is shown by FIGS. 3a to 3d, which are graphs showing the changes in the biomass concentration, product concentration, substrate concentration and active component concentration respectively over time, and by FIG. 4, which is a graph of the substrate concentration against the product concentration.

Considering the rate equation for the substrate concentration $C_s$, the control term for this equation is the term $D(C_{sf}-C_s)$. The proportion of the variable $C_s$ to the growth rate of the rate equation is given by the quotient:

$$q_{C_s} = \frac{C_s}{C_s + \mu_1}$$

From this equation the rate control function $\sigma(C_s)$ is derived:

$\sigma(C_s) = f_s e^{\xi q_{C_s}}$

This is applied to the control term to give a modified rate equation with stabilised control term as follows:

$$\frac{dC_s}{dt} = \sigma(C_s) D(C_{sf} - C_s) - \left(\frac{C_e \mu}{Y_{sx}}\right) - m_s C_x$$

This then shows how the quantities represented by the variables making up the control term can be adjusted in order to stabilise the system. In other words, in this particular case the rate control function defines how to adjust the substrate concentration $C_s$ of the system in order to keep the system stabilised.

Considering instead the rate equation for the product concentration $C_p$, the control term for this equation is taken to be the term $-DC_p$. This is because, in this case, it can be seen that production of the product $C_p$ is inhibited by the presence of the product itself, and it is desired to control the system by removing the product as it is produced. Considering then the rate equation that contribute, the variables that contribute to the growth of the rate equation are the variables $C_x$ and $C_e$, and their proportions to the growth rate of the rate equations are given by the equations:

$$q_{C_x} = \frac{C_x}{C_x + \mu_2}$$

$$q_{C_e} = \frac{C_e}{C_e + \mu_3}$$

From these equations the rate control function $\sigma(C_p)$ is derived:

$$\sigma(C_P) = f_P e^{\xi q_{C_x} q_{C_e}}$$

This is applied to the control term to give a modified rate equation with stabilised control term as follows:

$$\frac{dC_p}{dt} = C_x\left(\frac{C_e \mu}{Y_{px}} + m_p\right) - DC_p \sigma(C_p)$$

While in this embodiment control of both $C_s$ and $C_p$ has been described in order to control the system, in practice control of only one is required. However, control of the system could be achieved by controlling both variables (in practice controlling their underlying quantities, of course), if desired.

Figure 5A:
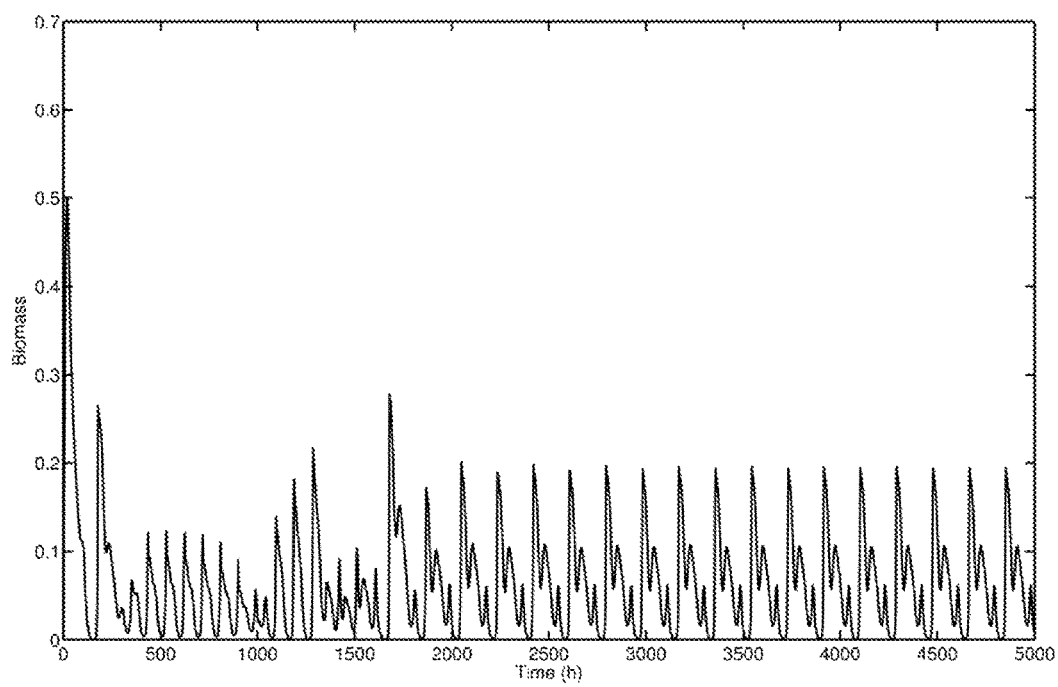
FIG. 5a is a graph showing the change over time in the biomass concentration in a bioethanol fermentor in which the control method of an embodiment of the present invention is applied at time 1000.
Figure 5B:
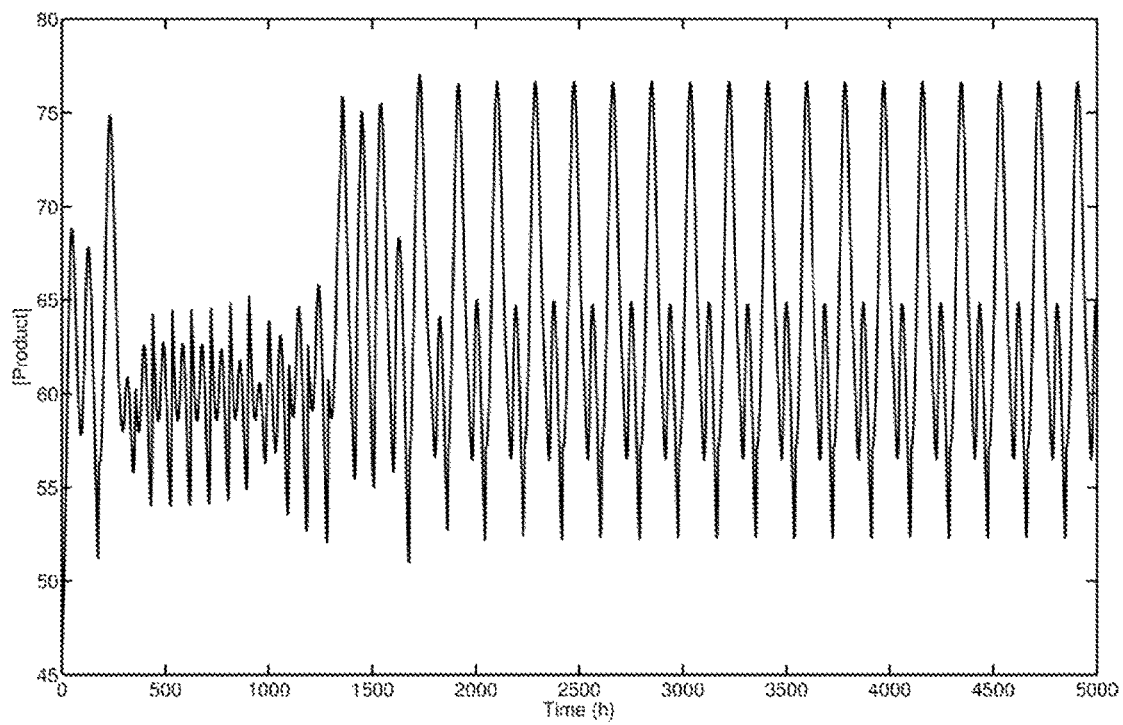
FIG. 5b is a graph showing the change over time in the product concentration.
Figure 5C:
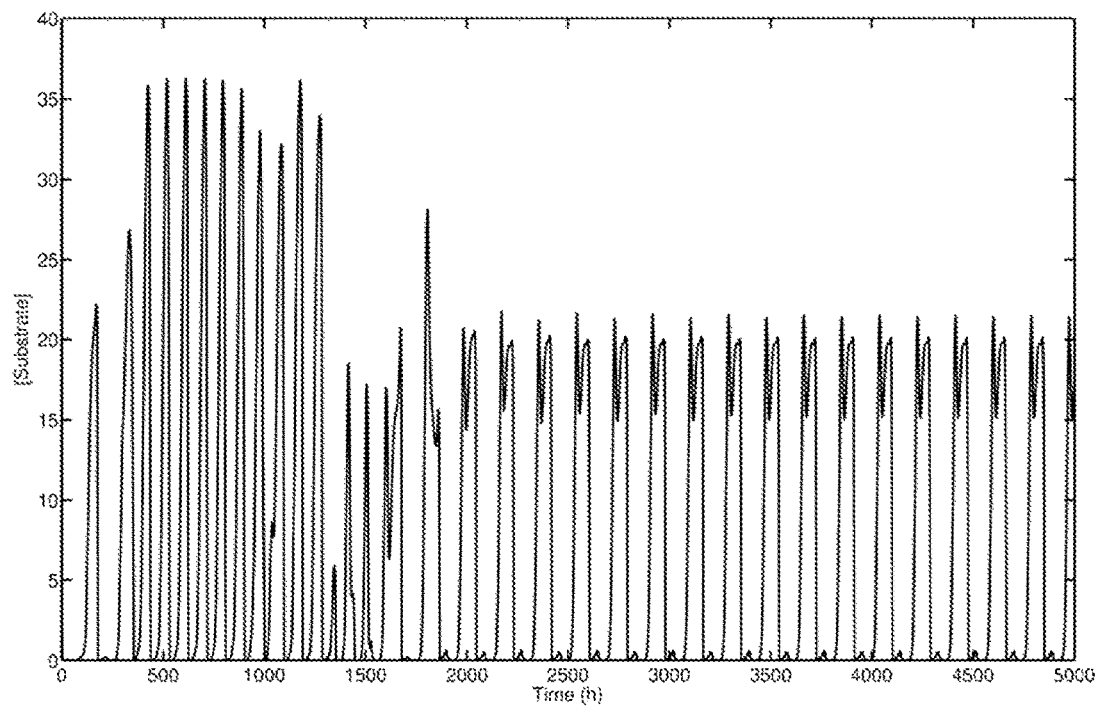
FIG. 5c is a graph showing the change over time in the substrate concentration.
Figure 6:
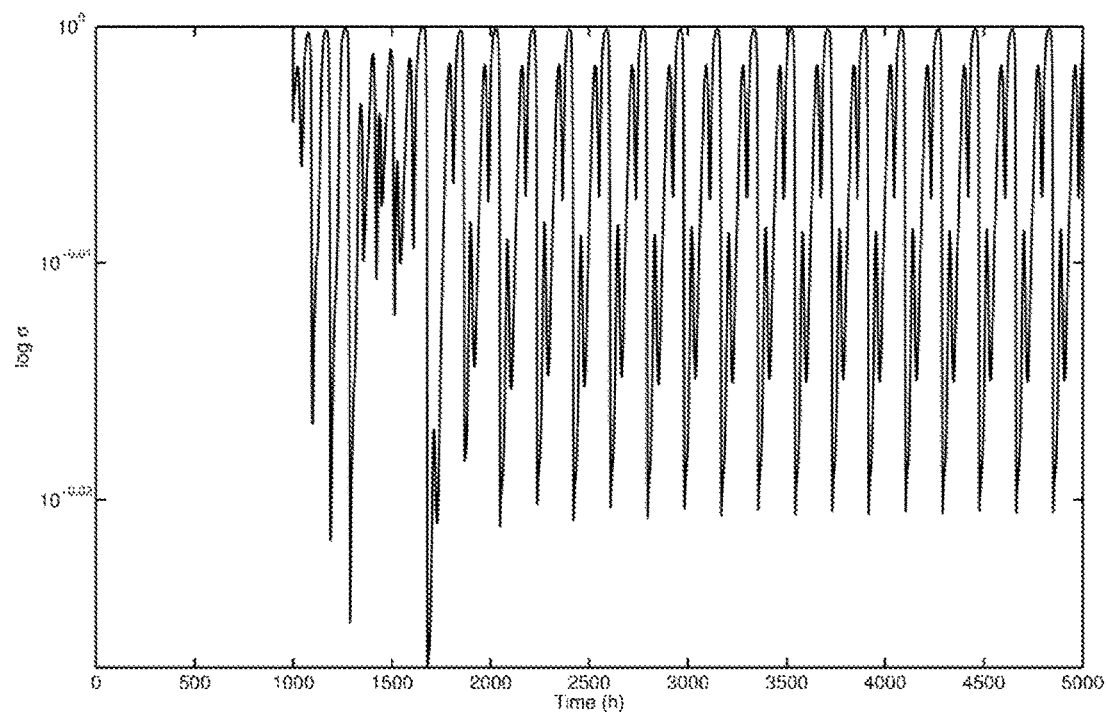
FIG. 6 is a graph showing the change over time in the control function in the bioethanol fermentor.
Figure 7:
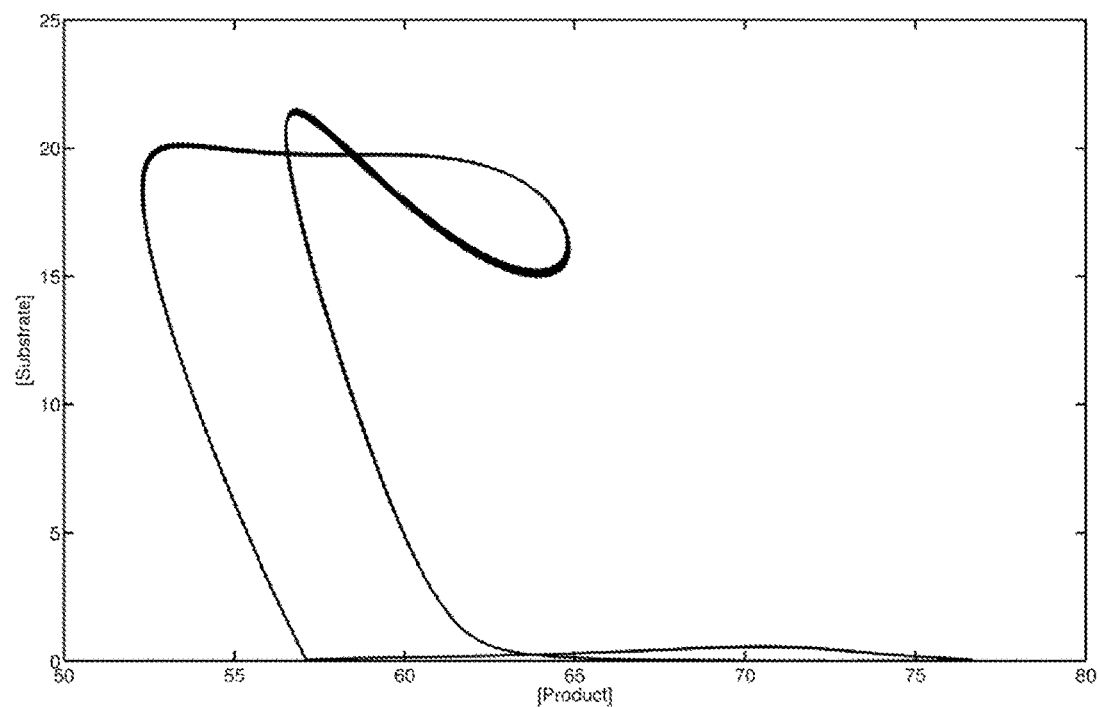
FIG. 7 is a graph showing the substrate concentration against the product concentration in the bioethanol fermentor.
Figure 8:
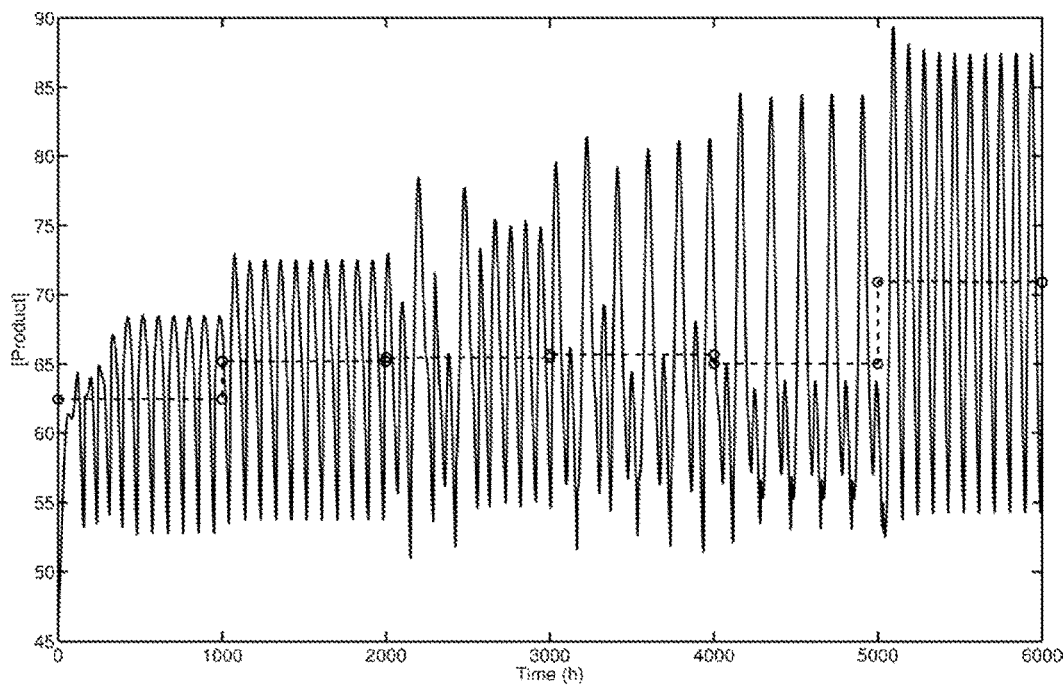
FIG. 8 is a graph showing the results of the method on the product concentration as the system undergoes several parameter changes

The effect of the applying the control method is shown in FIGS. 5a to 5c, which are graphs showing the changes in the biomass concentration, product concentration and substrate concentration respectively over time, in which the control method is applied at time 1000. Similarly, FIG. 6 is a graph showing the control function over time, as applied from time 1000. FIG. 7 is a graph of the substrate concentration against the product concentration showing the effect of applying the control method. Finally, FIG. 8 is a graph showing the results of the method on the product as the system undergoes several parameter changes; at every 1000 h the forcing parameter A is increased. As can be seen, this makes the system go through several oscillations, but nevertheless the method stabilises the system independent of the forcing term into stable oscillations. (The dotted line indicates the yield of ethanol as mean extraction concentration at each forcing parameter change, and notably as can be seen from the right-hand side of the graph the yield can be increased with higher controlled chaotic parameters.)

Example 3

An embodiment in which the method of the invention is applied to a wind turbine power generator is now described.

A wind turbine comprises a number of blades arranged around a rotor shaft, which convert kinetic energy in the wind into rotational movement. The rotor shaft is connected mechanically to a generator, which converts the rotational movement into electricity. There exist many types of wind turbine design, each with their own particular characteristics. In the following embodiment, the wind turbine is a variable speed, Horizontal Axis Wind Turbine (HAWT). However, the invention is equally applicable to other designs of wind turbine.

Typical wind turbine control methods are primarily dependant on the wind speed, as measured by an anemometer located at or near the top of the turbine structure. The turbine control is typically split into three regions, primarily governed by the prevailing wind speed but also by the rotational frequency of the generator shaft and the mechanical and electrical limits of the equipment. These control regions are defined as follows:

Region 1: In region 1, the generator is decoupled from the rotor shaft (i.e. rotation of the rotor shaft is not transmitted to the generator). If the wind speed is deemed too low to start the turbine the blades are pitched so as to produce minimal aerodynamic torque, so as to reduce stress on the blades while they are stationary. When the wind speed rises above a pre-determined value (based on the type of turbine), the blades are pitched to the angle which provides maximal aerodynamic torque, with the result that the wind acts to rotate the turbine. Once the generator shaft has reached a pre-determined angular velocity (again based on the type of turbine), the generator control torque is enabled, coupling the rotor shaft to the generator. At this stage region 2 power production is entered.

Region 2: The wind speed in region 2 is less than that required to produce the rated power of the generator and the generator control torque is adjusted in an attempt to track optimal power capture for the current rotor angular velocity and wind speed.

Region 3: The wind speed in region 3 is at least enough for the wind turbine to produce rated power output. The generator control torque is held at the rated torque. The control system is now responsible for maintaining the turbine at rated power by altering the rotor blade pitch to control the aerodynamic torque acting on the blades, and thereby controlling the amount of power extracted from the wind. The standard, non-proprietary, method of control used to alter the blade pitch and maintain rated power in this region is proportional-integral-derivative (PID) control, as described in Bossanyi, E. 1987, Adaptive Pitch Control for a 250 kW Wind Turbine, Proceedings of the British Wind Energy Conference, pp. 85-92; and Boukhezzar, B. and Siguerdidjane, H. Nonlinear Control of a Variable-Speed Wind Turbine Using a Two-Mass Model, IEEE Transactions on energy conversion, vol 26, No. 1. 2011.

The progression from region to region described above assumes a relatively smooth and steady change in wind speed. However, a particularly difficult scenario from the perspective of a control mechanism is that of gusting wind conditions. During large and variable wind gusts the wind turbine control mechanism must be able to maintain the angular velocity of the rotor assembly below a rated value and minimise mechanical stresses. Under such conditions, and without an appropriate control mechanism as provided by the present invention, power production must be halted.

It is known to use a Proportional Integral Derivative (PID) controller to as a method of control in many industries, including for the control of wind turbines. However, PID control is linear in nature, whereas a wind turbine is a non-linear dynamical system, as wind speed is inherently chaotic. The performance shortcomings of PID control can be mitigated using feedback techniques such as neural networks and fuzzy control, but these add complexity to the tuning process and can require high precision and sampling rates. Further, PID control must be adjusted for different operating conditions in order to ensure that thresholds are not exceeded, and the inability of PID control to work throughout the full spectrum of operating conditions can itself be a reason for requiring the shutdown of a wind turbine in highly gusty wind conditions.

A model of the wind turbine is given by the following equations, taken from Eisenhut, C., Krug, F., Schram, C. and Klockl, B. 2007, Wind-Turbine Model for System Simulations Near Cut-In Wind Speed, IEEE Transactions on energy conversion, vol. 22, No. 2; and Soltani, M., Wisniewski, R., Brath, P and Boyd, S, Load Reduction of Wind Turbines Using Receding Horizon Control, Proceedings IEEE Multi-Conference on Systems and Control, Denver, September 2011:

$$I_r \dot{\omega}_r = T_r - K_\theta \theta - B_\theta \dot{\theta} - B_r \omega_r$$

$$I_g \dot{\omega}_g = -T_g + \frac{K_\theta}{N}\theta + \frac{B_\theta}{N}\dot{\theta} - B_g \omega_g$$

$$\dot{\theta} = \omega_r - \frac{\omega_g}{N}$$

$$\dot{P} = \frac{1}{\tau_p}(T_g \omega_g - P)$$

where:

$$T_r = \frac{\pi}{2\omega_r} \rho R^2 V^3 C_p$$

$$T_g = \frac{\pi}{2N^3 \lambda^{*3}} \rho R^5 C_p^* \omega_g^2$$

and where $C_p$ is approximated by a non-linear function of $\lambda$ and $\beta$, from Muhando, E. B., Senjyu, T., Urasaki, N., Yona, A., Funabashi, T, Robust Predictive Control of Variable-Speed Wind Turbine Generator by Self-Tuning Regulator 2007 IEEE:

$$C_p(\lambda, \beta) = c_1 \left( \frac{c_2}{\lambda_i} - c_3 \beta - c_4 \right) e^{\frac{c_5}{\lambda_i}} + c_6 \lambda$$

with:

$$\frac{1}{\lambda_i} = \frac{1}{\lambda + 0.08\beta} - \frac{0.035}{\beta^3 + 1}$$

and $c_1=0.5176$, $c_2=116$, $c_3=0.4$, $c_4=5$, $c_5=21$ and $c_6=0.0068$.

The following terms are used in the above equations and below:

| | | |
|---|---|---|
| r and g | subscripts denote either rotor or generator | |
| β | the blade pitch angle. A value of β = 0 is used here. | |
| $\beta_{max}$ | the blade pitch angle: 90 | |
| $B_\theta$ | damping coefficient, chosen to be $3e^5$ | Nm rad$^{-1}$ sec$^{-1}$ |
| $B_r$ and $B_g$ | Represents frictive forces. 28 and 0.2 respectively | |

| | | |
|---|---|---|
| $C_p$ | Power coefficient | |
| $C_p^*$ | Optimal rotor power coefficient | |
| $I_r$ and $I_g$ | Inertia. $3e^5$ and 30 respectively | kg m$^2$ |
| $K_\theta$ | Stiffness constant of the drive-train assembly. $1e^6$ | Nm rad$^{-1}$ |
| θ | Shaft torsion | rad |
| λ | Tip-speed ratio and is given by $\omega_r R/V$ | |
| λ* | Optimal tip-speed ratio | |
| N | Gearing of the drivetrain. N = 60 | |
| $\omega_r$ and $\omega_g$ | Angular velocity of the rotor and generator respectively | rad s$^{-1}$ |
| ρ | Air density, taken here to be a constant 1.22521 | kg m$^{-3}$ |
| P | Power output of the turbine generator | W |
| R | Radius of the blade assembly, set here to 20 | m |
| $T_g$ | Generator torque | Nm |
| $T_r$ | Aerodynamic torque acting on turbine | Nm |
| $\tau_p$ | Generator time constant | s |
| $\tau_\beta$ | Blade pitch time constant | s |
| V | Wind speed as measured by the turbine anemometer | m s$^{-1}$ |

In order to control the wind turbine during gusty conditions, the aerodynamic torque $T_r$ is adjusted in order to keep the amount of power extracted from the wind within the rated limit of the turbine. Considering the rate equation $I_r \dot{\omega}_r$, the control term for this equation is simply $T_r$. From this, the following rate control function is derived:

$$\sigma_{\omega_r}(q_{T_r}) = f \cdot e^{(\xi(q_{T_r}))}$$

where:

$$q_{T_r} = \frac{T_r}{T_r + \mu_{T_r}}$$

and applying this to the existing model gives:

$$I_r \dot{\omega}_r = \sigma_{\omega_r}(q_{T_r}) T_r - k_\theta \theta - B_\theta \dot{\theta} - B_r \omega_r$$

In practice, the application of this control function to the aerodynamic torque would be used to determine how the blade pitch β should be adjusted.

Figure 9:
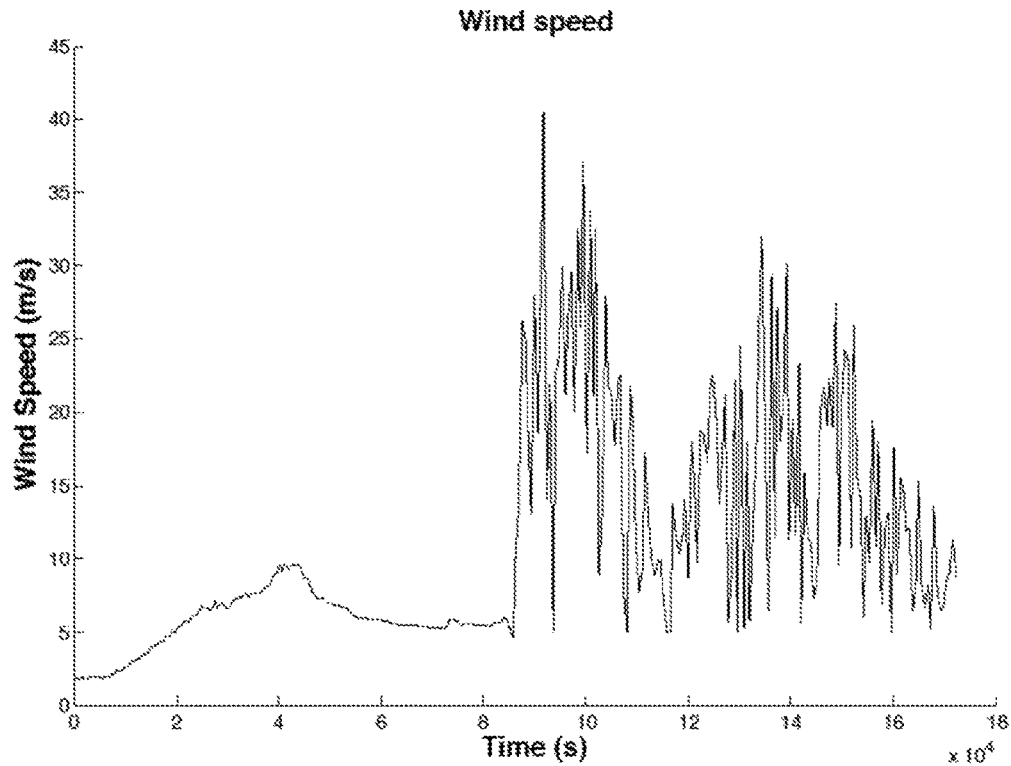
FIG. 9 is a graph showing the change in windspeed over time in a weather simulation.
Figure 10:
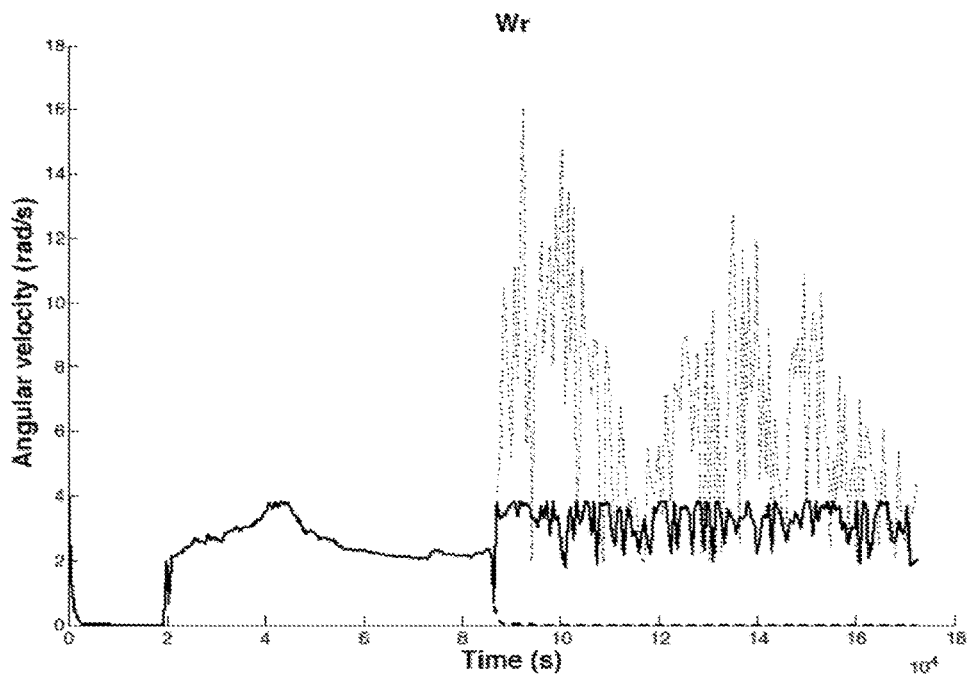
FIG. 10 is a graph showing the change over time in the angular velocity of a typical wind turbine and a wind turbine according to an embodiment of the invention.
Figure 11:
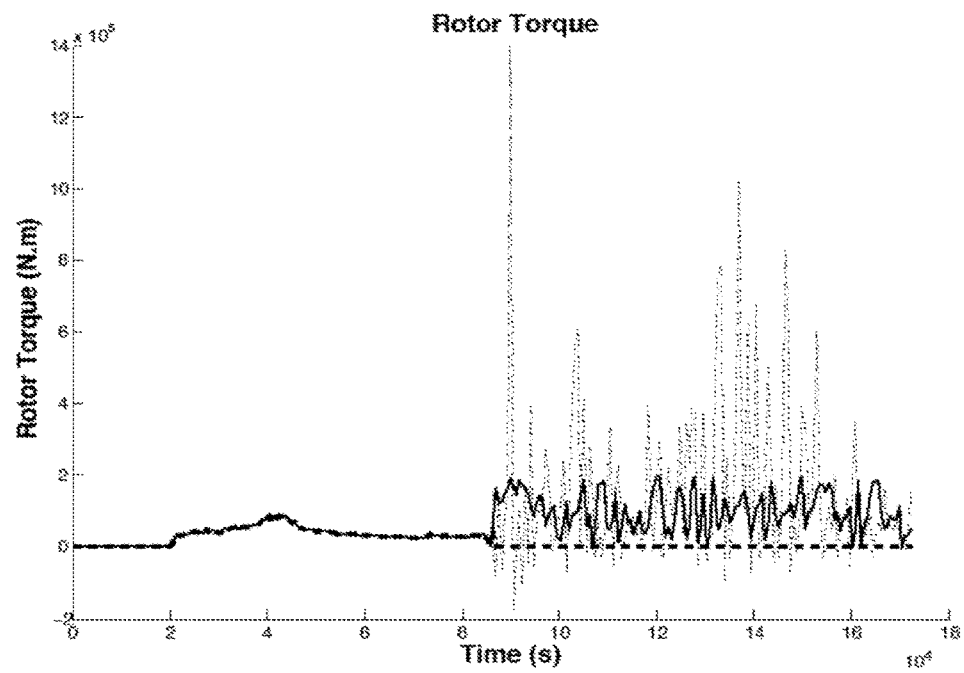
FIG. 11 is a graph showing the change over time in the rotor torque of the wind turbines.
Figure 12:
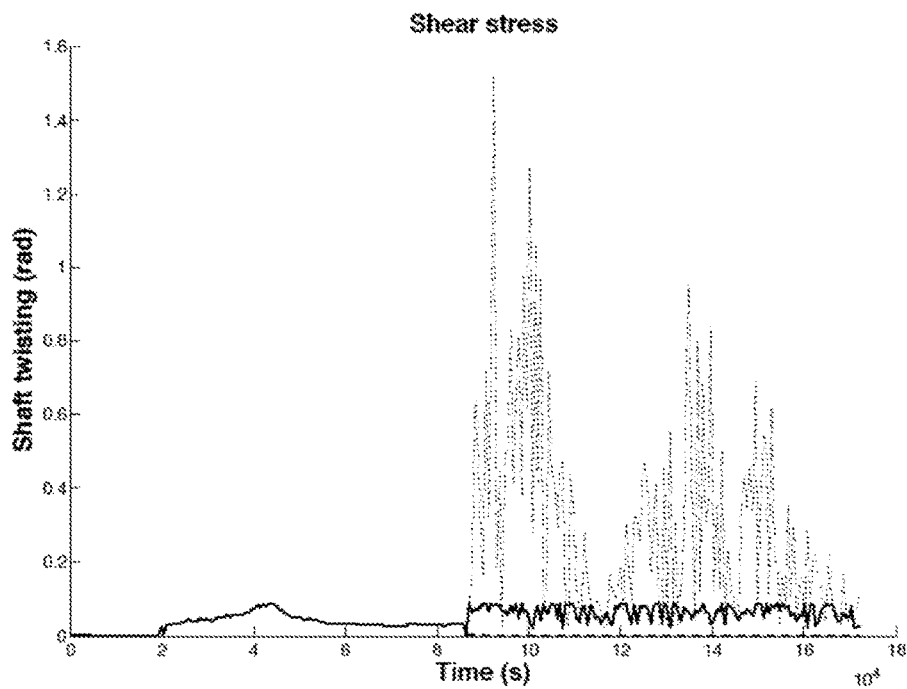
FIG. 12 is a graph showing the change over time in the shaft twisting of the wind turbines.

The effect of applying the control method is shown with reference to FIGS. 9 to 14. FIG. 9 shows a simulated wind speed data over a two day period. For the simulation, the constants of the control function were chosen as follows: f=0.74, $\mu_{T_r}$=1.6e$^6$ and ξ=−4.6. As can be seen, the wind speed on the second day was highly variable. For this example, the power which the turbine must not exceed is chosen to be ~400 KW, with a rated generator rotational frequency of 2350 rpm and therefore a rated generator torque of 1619 Nm. The wind speed at which this rated power occurs is around 10.31 ms$^{-1}$.

Figure 13:
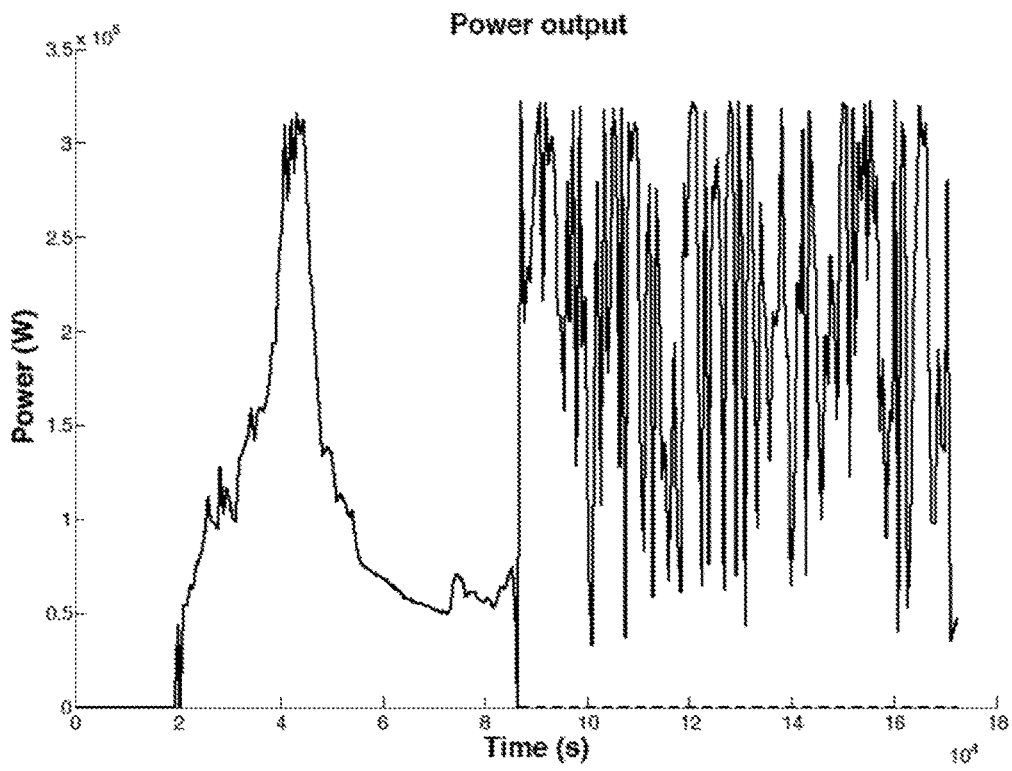
FIG. 13 is a graph showing the change over time in the power output of the wind turbines.
Figure 14:
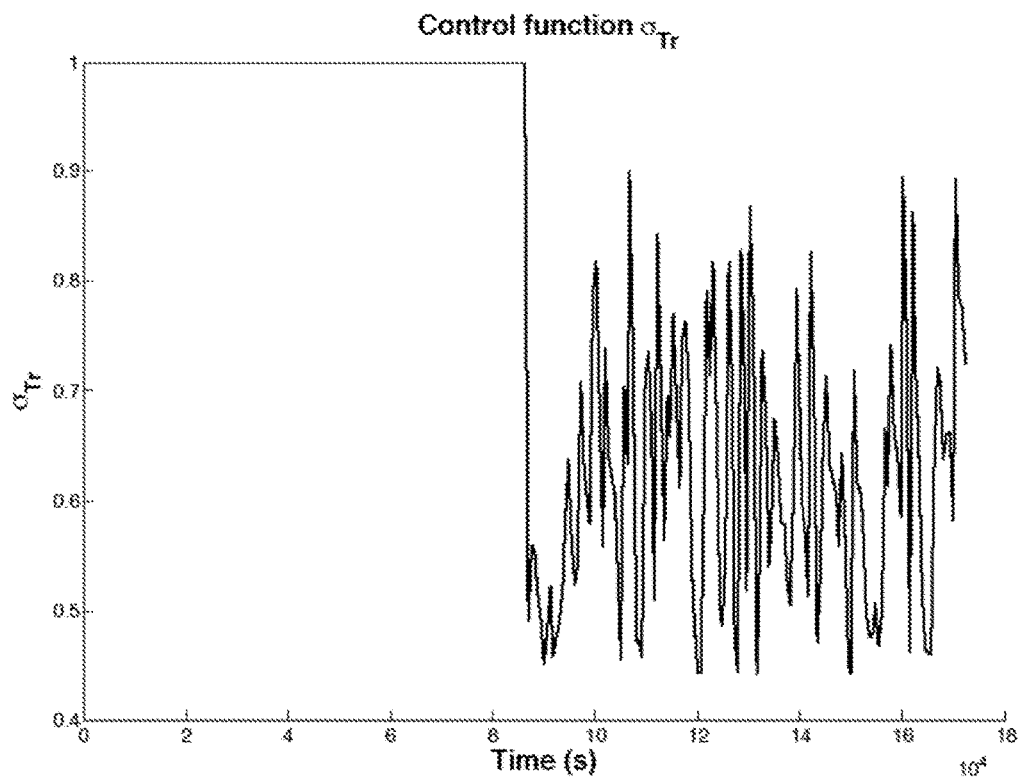
FIG. 14 is a graph showing the change in the control function in the wind turbine of the embodiment of the invention.

FIGS. 10 to 13 show the angular velocity of the generator, rotor torque, shear stress and power output of the turbine, without the control function being used shown by the variable dotted line, and with the control function being used shown by the variable solid line. (In practice if the turbine were to operate as shown by the dotted line it would suffer catastrophic failure, and so failsafe measures would act to prevent any movement of the blades as all, giving the flat dashed lines shown in the Figures.) FIG. 14 shows the behaviour of the control function. As can be seen, over the first day during which the control function is not used (so maintains a value of 1), the systems behave identically. On day two, where the gusty conditions mean the control function is used, it can be seen that control function acts to keep the operation of the turbine within safe limits, while as shown in FIG. 13 in particular allowing a significant amount of power to be produced by the turbine. In the simulation the turbine was able to produce ~4.88 MWh over the second day, while without the control function the turbine would essentially be unusable on the second day so no power would be produced.

In a related embodiment, the control functions are derived by considering the wind turbine system to be a combination of two distinct systems working together. The first system is the turbine rotor assembly, which needs to be limited in cases of high and/or gusty wind. The second system is the generator system, which needs to be controlled to operate within its rated power limits.

Control functions as follows are derived:

$$\sigma_V(q_V) = f_V \cdot e^{(\xi_V q_V)}$$

$$\sigma_P(q_P) = f_P \cdot e^{(\xi_P q_P)}$$

$$\sigma_{\omega_g}(q_{\omega_g}) = f_{\omega_g} \cdot e^{(\xi_{\omega_g} q_{\omega_g})}$$

where:

$$q_V = \frac{V^3}{V^3 + \mu_{V^3}}, q_P = \frac{P}{P + \mu_P}, q_{\omega_s} = \frac{\omega_g}{\omega_g + \mu_{\omega_s}}$$

These are applied to the model of the wind turbine as follows:

$$I_g \dot{\omega}_g = -(\sigma_{\omega_g}(q_{\omega_g})T_g) + \frac{K_\theta}{N}\theta + \frac{B_\theta}{N}\dot{\theta} - B_g \omega_g$$

$$\dot{P} = \frac{1}{\tau_p}(\sigma_{\omega_g}(q_{\omega_g})T_g \omega_g - P)$$

so the torque $T_g$ and angular velocity $\omega_g$ of the generator are controlled by the control function derived from the angular velocity $\omega_g$ of the generator; and the blade pitch is controlled as follows:

$$\dot{\beta} = \frac{1}{\tau_\beta}(\sigma_\beta \beta_{max} - \beta)$$

where:

$$\sigma_\beta = \sigma_V(q_V)\sigma_P(q_P)$$

so the blade pitch β is controlled by the combination of the control functions based on the wind speed V and the power output of the turbine generator P.

Other controls that may be used are as follows:

$$\sigma_{\omega_r}(q_{\omega_r}) = f_{\omega_r} \cdot e^{(\xi_{\omega_r} q_{\omega_r})}$$

$$\sigma_{T_r}(q_{T_r}) = f_{T_r} \cdot e^{(\xi_{T_r} q_{T_r})}$$

$$\sigma_{T_g}(q_{T_g}) = f_{T_g} \cdot e^{(\xi_{T_g} q_{T_g})}$$

$$\sigma_\theta(q_\theta) = f_\theta \cdot e^{(\xi_\theta q_\theta)}$$

where:

$$q_{\omega_r} = \frac{\omega_r}{\omega_r + \mu_{\omega_r}}, q_{T_r} = \frac{T_r}{T_r + \mu_{T_r}}, q_{T_g} = \frac{T_g}{T_g + \mu_{T_g}}, q_\theta = \frac{\theta}{\theta + \mu_\theta}$$

Simulations of the model incorporating the above control functions, particularly in contrast to models incorporating PID control, provided a more controlled power output and so were able to operate at a higher mean power output while still ensuring that power spikes would not exceed the rated output of the generator. Further, the drive train of the turbine had a lower mean level of stress, and lower maximum stress peak amounts.

Example 4

An embodiment in which the method of the invention is applied to a Heating Ventilation and Air Conditioning (HVAC) system is now described. HVAC systems may be found operating in a large number of different scenarios, such as offices, automobiles, factories, laboratories, refrigeration systems and life-support/protective suits.

Figure 15:
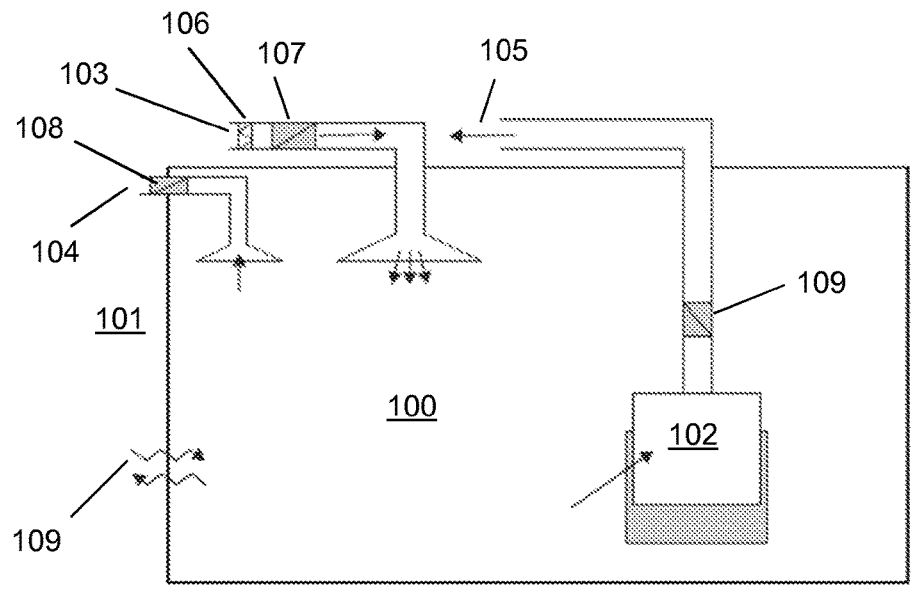
FIG. 15 is a schematic diagram of a laboratory HVAC system.

A schematic drawing of a laboratory HVAC system is shown in FIG. 15. The drawing shows a laboratory 100 and adjacent space 101; heat is conducted between the two as shown by the arrows 109. The laboratory 100 contains a fume hood 102. An actuator 109 draws air from the fume hood to a fume exhaust 105, causing air to be drawn from the laboratory 100 into the fume hood 102. A further actuator 108 draws air from the laboratory 100 to a general exhaust 104. Finally, supply air 103 is blown into the laboratory 100 by an actuator 107, in the process being heated by a heating coil 106.

A model for a laboratory HVAC system, derived from Osman, A., Mitchell, J. W. & Klein, S. A, Development of a Simulator for Laboratory HVAC System (http://www.ini-ve.org/members_area/medias/pdf/Inive/clima200 0/1997/P274.pdf) is as follows:

$$\dot{T} = \frac{T\dot{P}}{P} + \frac{T\dot{V}_e}{V} - \frac{T^2}{PV}\left(\frac{P_s \dot{v}_e}{T_s} + \frac{P_{ad}\dot{v}_{ad}}{T_{ad}}\right)$$

$$\dot{P} = \frac{1}{c_v V}(P_s \dot{v}_s c_p + P_{ad}\dot{v}_{ad}c_p - P\dot{v}_s c_p + R\dot{q}_{gen} + R\dot{q}_{tr})$$

where the terms used are as follows:

| | | |
|---|---|---|
| $c_v$ | Specific heat at constant volume | kJ/kg · K |
| $c_p$ | Specific heat at constant pressure | kJ/kg · K |
| P | Air pressure | kPa |
| $P_{ad}$ | Pressure of the infiltrating air from adjacent spaces | kPa |
| $P_e$ | Pressure of the exhaust air | kPa |
| $P_s$ | Pressure of the conditioned supply air | kPa |
| $\dot{q}_{gen}$ | Rate of generation of internal heat | kJ/min |
| $\dot{q}_{tr}$ | Rate of heat transfer by conduction | kJ/min |
| R | Gas constant | kJ/kg · K |
| T | Room air temperature | ° C. |
| $T_{ad}$ | Temperature of the infiltrating air from adjacent spaces | ° C. |
| $T_s$ | Temperature of the conditioned supply air | ° C. |
| V | Volume of the room | m³ |
| $\dot{v}_s$ | Volumetric flow-rate of the conditioned supply air | m³/min |
| $\dot{v}_{ad}$ | Volumetric flow-rate of the infiltrating air from adjacent spaces | m³/min |
| $\dot{v}_s$ | Volumetric flow-rate of the exhaust air | m³/min |

In some laboratory spaces the pressure of the air in the laboratory, P, will be maintained at a lower value than that of the adjacent spaces, $P_{ad}$. This will help to prevent the flow of any harmful substances out laboratory. Alternatively, in a space such as a clean-room, this relationship is reversed as in this case it is desirable to ensure that no contaminant can enter the laboratory from the adjacent spaces.

The control system for such an HVAC system would typically be responsible for maintaining specific variables such as temperature, pressure differential ($P_{ad}$–P), volumetric air-flow rates, general exhaust among others, within well-defined ranges corresponding to safety and/or comfort.

Considering the first equation, the control term is $\dot{V}_e$ (the volumetric flow-rate of the exhaust air), giving a control function:

$$\sigma_T(q_{\dot{v}_e}) = f_T \cdot e^{\left(-\xi_T(q_{\dot{v}_e})\right)}$$

where:

$$q_{\dot{v}_e} = \frac{\dot{v}_e}{(\dot{v}_e + \mu_{\dot{v}_e})}$$

Considering instead the second equation, the control term is $\dot{v}_s$ (the volumetric flow-rate of the conditioned supply air), giving a control function:

$$\sigma p(q_{\dot{v}_s}) = f p \cdot e^{(-\xi p(q_{\dot{v}_s}))}$$

where:

$$q_{\dot{v}_s} = \frac{\dot{v}_s}{(\dot{v}_s + \mu_{\dot{v}_s})}.$$

The control functions can then be applied to the control terms in the first and second equation respectively, in order to determine how the exhaust air and/or conditioned supply air should be controlled.

Example 5

An embodiment in which the method of the invention is applied to control chaotic behaviour of lasers is now described. Semiconductor lasers are used in many applications, for example in optical communication networks, DVD players and many other applications. The dynamic behaviour of lasers can be extremely complex, in particular under the influence of external perturbations such as feedback or delay coupling.

A first type of semiconductor laser system is a non-linear laser ring cavity, which can be modelled using an Ikeda map as described in K. Ikeda, Multiple-valued stationary state and its instability of the transmitted light by a ring cavity system, Optics Communications, 30(2):257-261, 1979. By plotting the real and imaginary parts of the complex equation:

$$z(n+1) = a - bz_n e^{iK - \frac{i\eta}{1+|z_n|^2}}$$

with x=Re(z) and y=Im(z), the Ikeda map can be described as follows, where typically a=1, b=0.9, K=0.4 and η=6.0:

$$\phi = K - \frac{\eta}{(1+x_n^2+y_n^2)}$$

$$x_{n+1} = a + b(x_n \cos\phi - y_n \sin\phi)$$

$$y_{n+1} = b(x_n \sin\phi + y_n \cos\phi)$$

Considering the equations $x_{n+1}$ and $y_{n+1}$, the control term is $\phi$, which represents the amount of dissipation within the cavity, giving a control function of:

$$\sigma(x,y) = f e^{\xi q_x q_y} = f e^{\left\{\frac{\xi(xy)}{(xy+x+y+\mu)}\right\}}$$

where:

$$q_x = \frac{x}{x+\mu_x} \quad q_y = \frac{y}{y+\mu_y}$$

giving:

$$\phi' = K - \frac{\eta}{(1+\sigma(x_n,y_n)x_n^2+\sigma(x_n,y_n)y_n^2)}.$$

Figure 16:
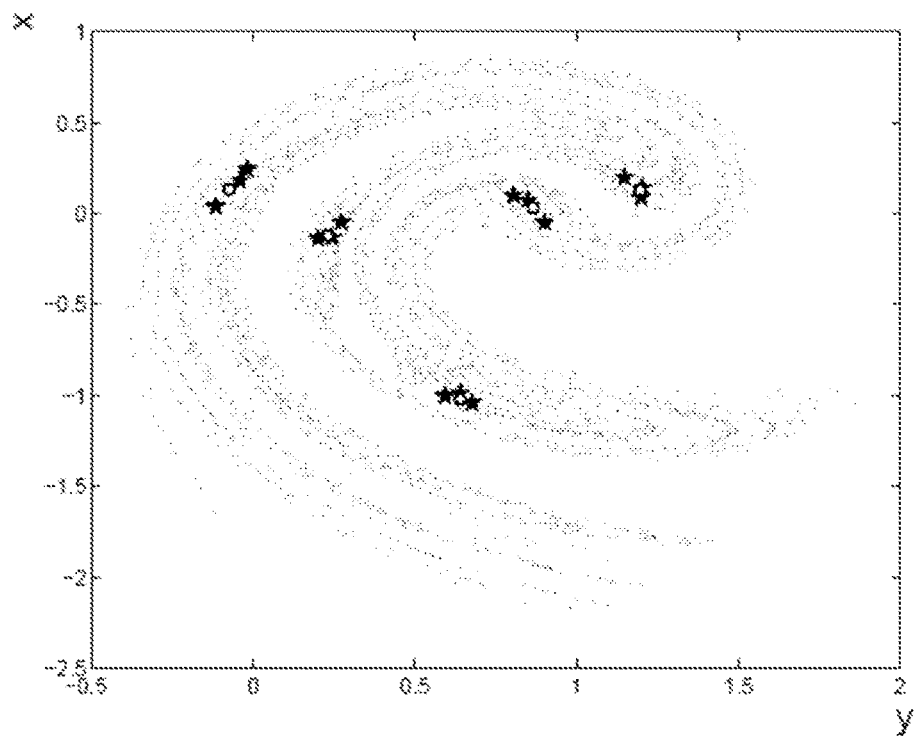
FIG. 16 shows the behaviour of a typical non-linear laser ring cavity laser system and a non-linear laser ring cavity laser system according to an embodiment of the invention.
Figure 17:
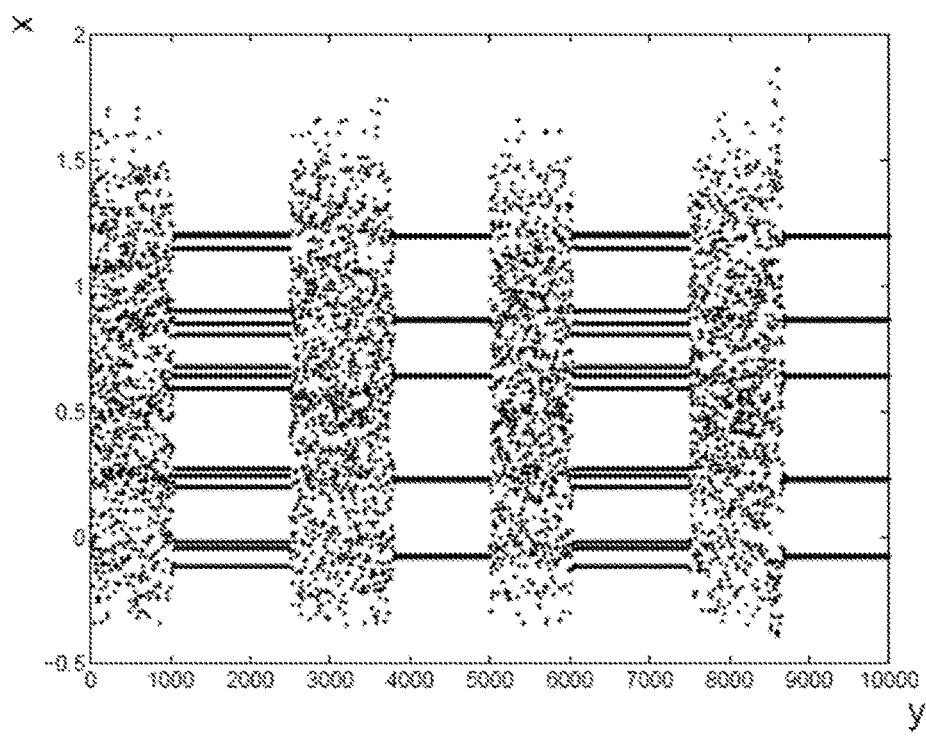
FIG. 17 shows the behaviour of the laser systems of FIG. 16 when the control is periodically turned on and off.

Taking μ=5 and ξ=1, FIG. 16 shows the uncontrolled Ikeda map, with on top two different stabilised orbits, a five period orbit indicated by open circles, and a fifteen period orbit indicated by stars. The orbit to which the system is stabilised will depend upon the proximity of the system to the orbit when control is enabled. By turning the control off and on again, different orbits may be found. To demonstrate this, FIG. 17 shows a simulation in which control is enabled after 1000 timesteps and is turned off again after a further 1500 timesteps. This pattern is then repeated four times with the period of 2500 timesteps. It can be seen from FIG. 17 that the system stabilises subsequently into a period 15 orbit and then a period 5 orbit, the period 15 orbit and the period 5 orbit again.

A second type of semiconductor laser system is a laser operating with delayed optical feedback. A model of this type of system, the Lang-Kobayashi model, is described in T. Sano, Antimode dynamics and chaotic itinerancy in the coherence collapse of semiconductor lasers with optical feedback, Physical Review A, 50(3):2719-2726, 1994, and is as follows:

$$\Delta\phi = \phi - \phi(t-\tau)$$

$$\frac{dP}{dt} = \Delta N P(t) + 2\gamma\sqrt{P(t-\tau)P(t)}\cos(\Delta\phi+\omega\tau) + \beta(\Delta N + N_{th})$$

$$\frac{d\phi}{dt} = \frac{\alpha}{2}\Delta N - \gamma\sqrt{\frac{P(t-\tau)}{P(t)}}\sin(\Delta\phi+\omega\tau)$$

$$\frac{d\Delta N}{dt} = -\Delta N - P(t)(K+\Delta N) + \Delta J$$

where P is the photon number, $\phi$ the slowly varying part of the optical phase, and the deviation of the carrier number from the threshold value $N_{th}$ of the solitary laser $\Delta N = N - N_{th}$. ω is the optical angular frequency, which is assumed to be zero. K=1000 is the damping constant for the photon number, and $\Delta J$ the pumping current deviation from the threshold. The feedback strength γ is given by:

$$\gamma = \eta \frac{(1-r)}{\tau_c}\sqrt{\frac{R}{r}}$$

where R is the power reflectivity of the external mirror, r that of the laser facets, $\tau_c$ the round trip time of the cavity and $\eta$ the coupling ratio. Other parameter values are $\alpha=6$, $\beta=10^{-5}$, $\eta=1$, $N_{th}=10^3$.

Considering the equations for the changes in P or $\phi$, the control term is taken to be $\gamma$; this is also a practical choice as it can be controlled in a physical implementation. The control function is $\sigma$ then given by:

$$q_P = \frac{P}{P + \mu_P}$$

$$q_\phi = \frac{\phi}{\phi + \mu_\phi}$$

$$\sigma(P, \phi) = f e^{\xi q_P q_\phi}$$

where f=6 and $\xi=-1$, giving the new term:

$$\gamma' = \sigma(P, \phi) \eta \frac{(1-r)}{\tau_c} \sqrt{\frac{R}{r}}.$$

Figure 18:
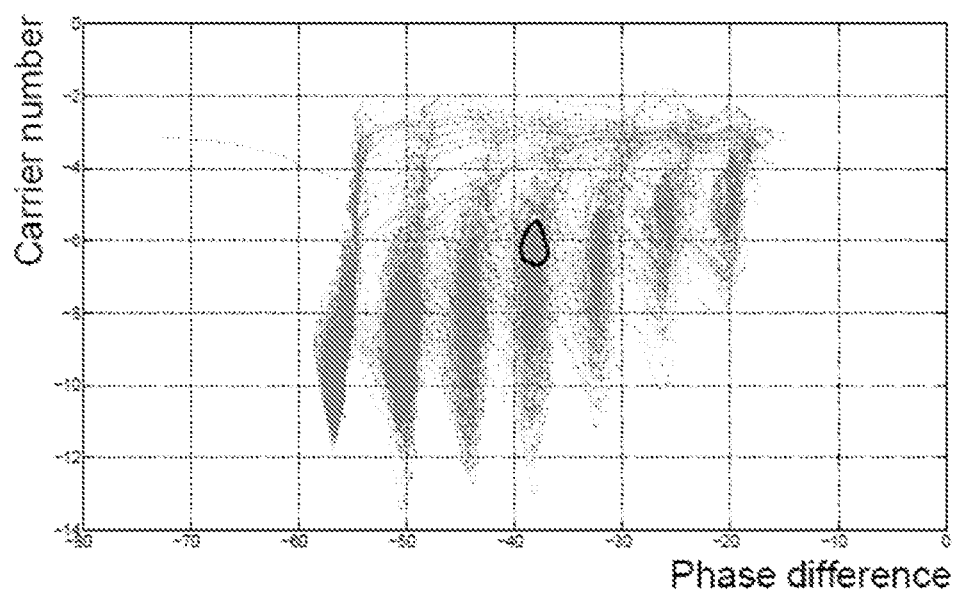
FIG. 18 is a phase diagram showing the behaviour of a typical laser operating with delayed optical feedback and a laser operating with delayed optical feedback according to an embodiment of the invention.
Figure 19:
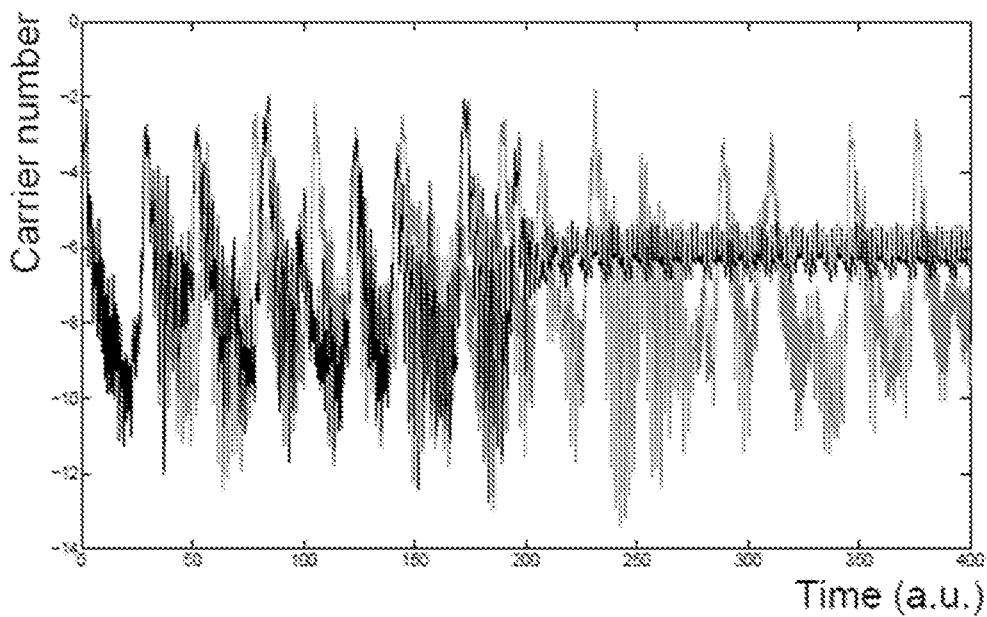
FIG. 19 shows the behaviour of the laser systems of FIG. 18 over time.
Figure 20:
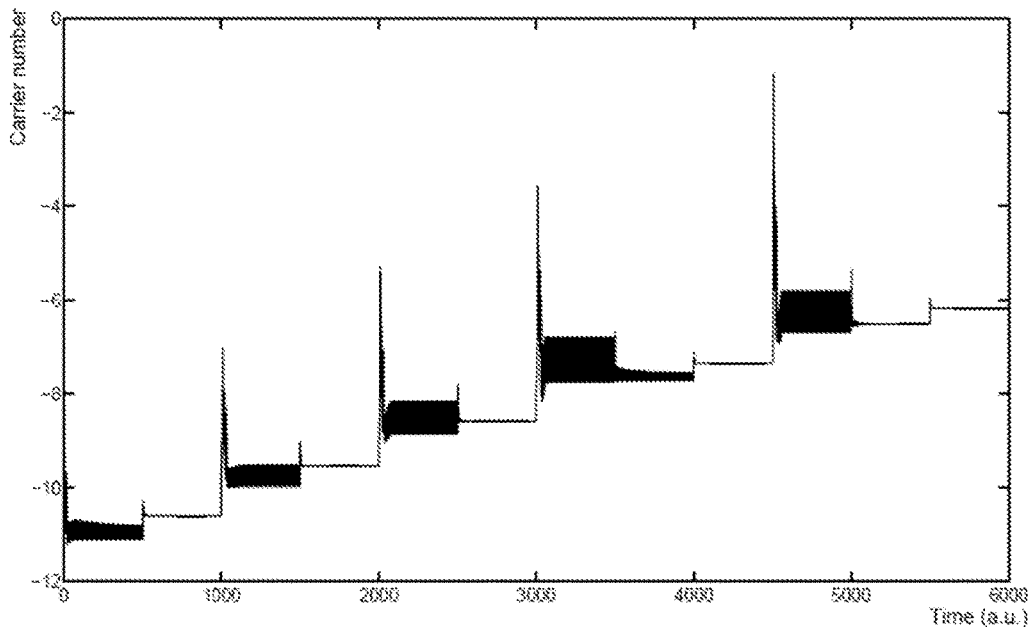
FIG. 20 shows the behaviour of the laser system of the invention when the pumping current is periodically varied.

FIG. 18 shows the phase space representation of the carrier number of the system versus the phase difference, with the uncontrolled system shown underneath and the controlled system shown in black on top. FIG. 19 similarly shows the change in carrier number over time, where control is enabled at time=200 au. In both it can be seen that the control function substantially stabilises the behaviour of the system. Further, FIG. 20 shows the behaviour of the behaviour of the system over time where every 500 time steps the pumping current $\Delta J$ is increased (from −10 up to +1). It can be seen that the system goes through short transients but stabilises quickly every time. The horizontal line (e.g. from 500 to 1000) means that the system is in controlled steady state. The thick black bars mean that the system is oscillating at a controlled stable but high frequency. Because the control method of the invention is effective in controlling the chaotic system independent of parameter changes which may cause bifurcations, it can be used to maintain the stability of the laser with different amount of the pumping current $\Delta J$.

A third type of semiconductor laser system is a physical optoelectronic device with a feedback loop. A model of this type of system, the Blakely model, is described in J N Blakely, L Illing, and Daniel J Gauthier, High-speed chaos in an optical feedback system with flexible timescales, Quantum Electronics, IEEE, 40(3):299-305, 2004; and in Y. G. Zheng and Z. H. Wang. Stability and Hopf bifurcations of an optoelectronic time-delay feedback system, Nonlinear Dynamics, 57(1-2):125-134, September 2008. Its main features are delay feedback with additional low-pass and high-pass filters to give it a band-pass characteristic. The Blakely model is described by the equations:

$$v_{det}(t) = \gamma p(t)(1 + \beta \sin(\alpha(p(t) - p_0)))$$

$$\frac{v(t)}{dt} = \frac{(-v(t) + v_{det}(t - T0))}{\tau_l}$$

$$\frac{p(t)}{dt} = \frac{-(p(t) - p_0)}{\tau_h} + kv(t)$$

where v(t) is the voltage at the output of the low-pass filter, p(t) is the laser output which relates to the voltage at the output of the high-pass filter, $V_{det}(t)$ is the voltage output of the (non-linear) photodiode, $p_0=26$ is the emission power, $T_0=19.1$ is the timed delay in the feedback loop, $\tau_l=0.66$ is the low-pass filter time constant, $\tau_h=22$ is the high-pass filter time constant, $\gamma=0.0053$ is the system amplification by feedback strength, $k=4.8$ is the voltage to power conversion strength, $\alpha=1.89$ determines the sensitivity of the interferometer and $\beta=0.8$ is the fringe visibility.

Considering the equation for the change in time of p, the control term of this equation is taken to be v(t), voltage at the output of the low-pass filter. This is also practical for physical implementation, as feedback strength is not easily modifiable. The control function and modified rate equation are then:

$$q_p = \frac{p}{p + \mu_p}$$

$$q_v = \frac{v}{v + \mu_v}$$

$$\sigma(p, \phi) = f^{\xi q_p q_v}$$

$$\frac{p(t)'}{dt} = \frac{-(p(t) - p_0)}{\tau_h} + kv(t)\sigma(p, v)$$

where f=20 and $\xi=-1$.

Figure 21:
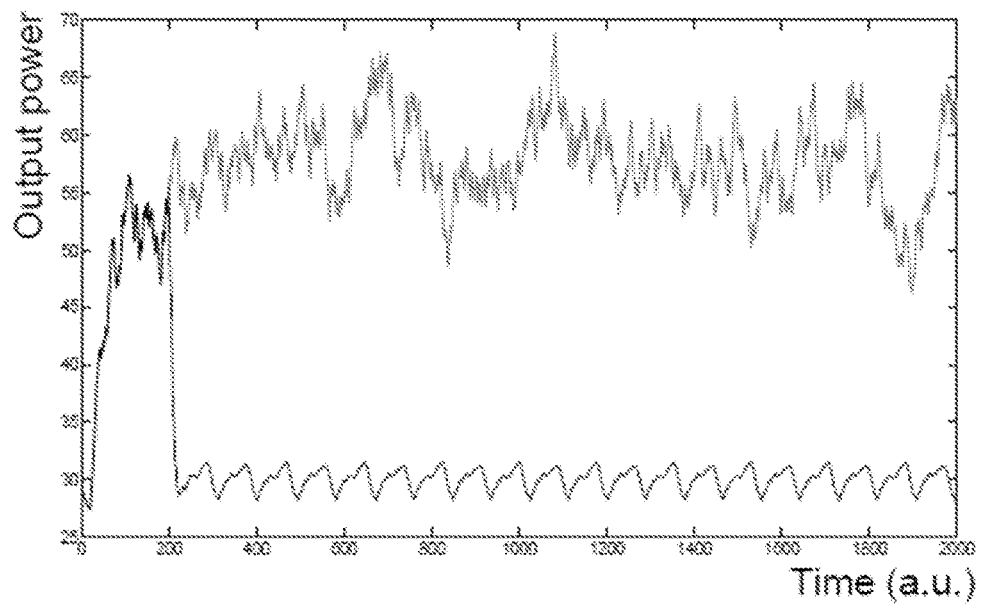
FIG. 21 shows the output power over time of a typical physical optoelectronic device laser system with a feedback loop and a physical optoelectronic device laser system with a feedback loop according to an embodiment of the invention.
Figure 22:
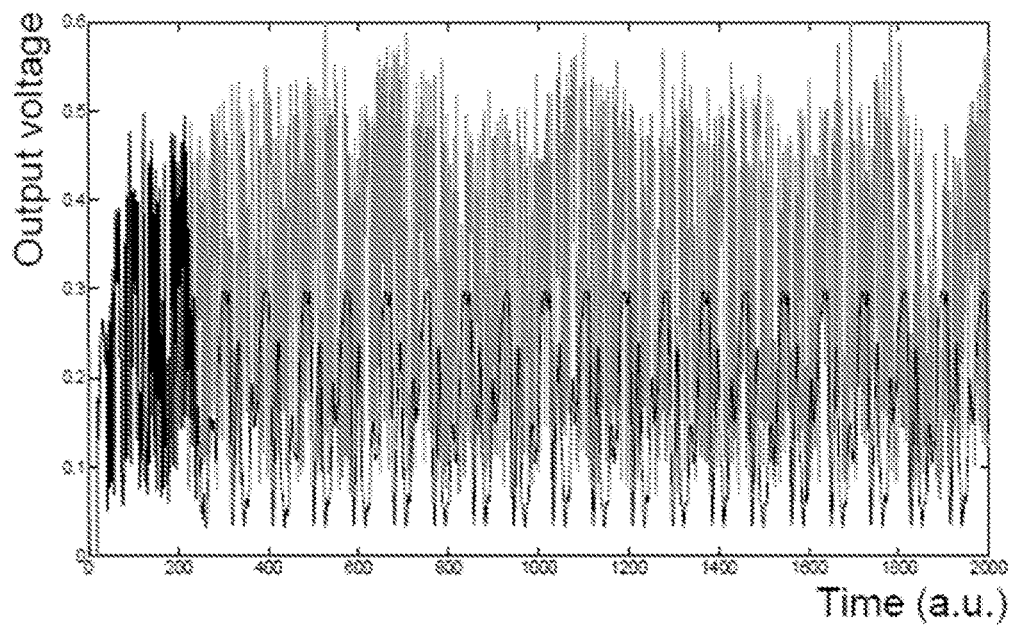
FIG. 22 shows the output voltage of the laser systems.

FIGS. 21 and 22 show the change of the output power and voltage over time, for the uncontrolled system in grey and the controlled system in black. The control is implemented at time=200 au. The system is immediately controlled into a stable 4-orbit that greatly reduces the needed output power to maintain the stability of the system, thereby making it more efficient and economical, the reduction in needed output being approximately 56%.

Example 6

Figure 23:
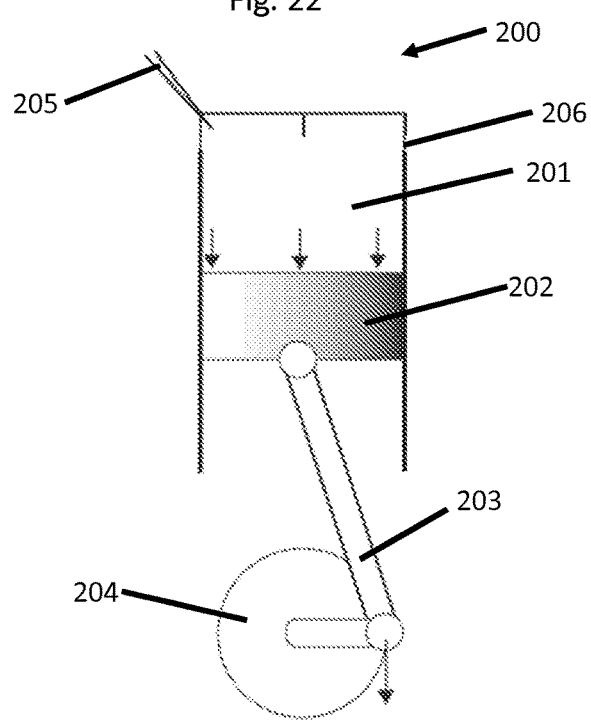
FIG. 23 is a cylinder of an internal combustion engine.

An embodiment in which the method of the invention is applied to an internal combustion engine is now described. An internal combustion engine comprises a crankshaft which is driven by a plurality of cylinders. An exemplary cylinder is shown in FIG. 23. The cylinder 200 comprises a cylinder cavity 201 within which a piston 202 can move. The piston 202 drives a piston rod 203 which in turn rotates the crankshaft 204. The cylinder 200 has a fuel intake 205 though which a fuel injector injects fuel (for example octane) into the cylinder cavity 201, and an air intake 206 through which air is taken into the cylinder cavity 201. As will be well understood by the skilled person, the cylinder 200 has "four-stroke" operation comprising an intake stroke, a compression stroke, a power stroke and an exhaust stroke.

In conventional engines various parameters such as amount of fuel to be injected are controlled by means of lookup tables, which use properties of the engine such as current speed, torque, temperature, acceleration and the like in order to provide pre-determined ideal values for the parameters. The ideal values are typically determined by testing an engine throughout its range of performance at the product development stage. However, while this allows a certain level of performance to be guaranteed, it does not allow the optimal performance of which the engine may be capable. In the internal combustion engine of the present embodiment of the invention, the various parameters of the engine are controlled using control functions based on the properties of the engine, as described below.

The operation of the engine is modelled as follows. The height h of the cylinder head with respect to the crankshaft angle A is described by:

$$h = r\cos(A) + (l^2 - r^2 \sin^2(A))^{1/2}$$

where r is the radius of the crankshaft 204 and l is the length of the arm 203. The mass-flow equations for the fuel and other components are as follows:

$$\dot{m}_f = C_f a_f (2P_{P_f}(P_f - P_{cyl}))^{\frac{1}{2}} \Psi_F +$$

$$\frac{(M_f^P - M_f^R)}{1000}(8A_r^C + (18A_r^H))\Psi_C + C_f a_e \left(2\frac{m_f}{V}(P_{ex} - pp_f)\right)^{\frac{1}{2}} \Psi_E$$

$$\dot{m}_{o_2} = C_{o_2} a_a (2P_{P_{o_2}}(0.2P_a - P_{cyl}))^{\frac{1}{2}} \Psi_A +$$

$$\frac{(M_{o_2}^P - M_{o_2}^R)}{1000}(2A_r^O)\Psi_C + C_{o_2} a_e \left(2\frac{m_{o_2}}{V}(P_{ex} - pp_{o_2})\right)^{\frac{1}{2}} \Psi_E$$

$$\dot{m}_{n_2} = C_{n_2} a_a (2P_{P_{n_2}}(0.8P_a - P_{cyl}))^{\frac{1}{2}} \Psi_A +$$

$$\frac{(M_{n_2}^P - M_{n_2}^R)}{1000}(2A_r^N)\Psi_C + C_{n_2} a_e \left(2\frac{m_{n_2}}{V}(P_{ex} - pp_{n_2})\right)^{\frac{1}{2}} \Psi_E$$

$$\dot{m}_{co_2} = \frac{(M_{co_2}^P - M_{co_2}^R)}{1000}(A_r^C + 2A_r^O)\Psi_C + C_{co_2} a_e \left(2\frac{m_{co_2}}{V}(P_{ex} - pp_{co_2})\right)^{\frac{1}{2}} \Psi_E$$

$$\dot{m}_{h_2o} = \frac{(M_{h_2o}^P - M_{h_2o}^R)}{1000}(2A_r^H + A_r^O)\Psi_C + C_{h_2o} a_e \left(2\frac{m_{h_2o}}{V}(P_{ex} - pp_{h_2o})\right)^{\frac{1}{2}} \Psi_E$$

where typical modelling assumptions have been made regarding heat loss (zero heat loss during the combustion process) and ideal gas behaviour. Dissociation of other combustion species is not specifically modelled, rather it has been assumed that excess fuel is not combusted fully or partially and is represented as octane in the combustion products.

The crank dynamics are then described by:

$$I_c \dot{\omega}_c = \tau_c - K_\theta \theta - B_\theta \dot{\theta} - \varphi_c \omega_c$$

$$I_d \dot{\omega}_d = -\tau_d + \frac{K_\theta}{N}\theta + \frac{B_\theta}{N}\dot{\theta} - \varphi_d \omega_d$$

$$\dot{\theta} = \omega_c - \frac{\omega_d}{N}$$

$$\dot{\Omega}_{eng} = \frac{1}{T_p}(\tau_c \omega_c - \Omega_{eng})$$

while the torque on the crank $\tau_c$ due to the force acting on the piston head as a result of the pressure inside the cylinder cavity is described by:

$$\phi = \arcsin\left(\frac{r\sin(A)}{l}\right)$$

$$F = P_{cyl} \pi r_{cyl}^2$$

$$F_l = F\cos(\phi)$$

$$F_c = F_l \sin(A + \phi)$$

$$\tau_c = rF_c$$

where A is the crank-angle and is in the range [0, 4π) radians, F is the force exerted on the piston-head by the gas mixture, $F_l$ is the force transmitted down the piston rod, $F_c$ is the tangential force exerted on the crankshaft at the interface between the crankshaft and the piston rod and $\tau_c$ is the torque exerted on the crankshaft by the piston.

Combustion is modelled using the octane combustion equations described in Flagan, Richard C. & Seinfeld, John H. Fundamentals of air pollution engineering. Prentice-Hall, Inc., Englewood Cliffs, N.J. (1988). In a stoichiometric situation (there is exactly the amount of air required to burn all the fuel) or off-stoichiometric situation (more air than required to burn all the fuel), for one mole of fuel the reaction equation is:

$$C_8H_{18} + x(O_2 + 3.76N_2) \rightarrow 8CO_2 + 9H_2O + (3.76x)N_2 + (x-12.5)O_2$$

In a rich air/fuel mixture (not enough air required to burn all the fuel) again for one mole of fuel the reaction equation is:

$$C_8H_{18} + \chi(O_2 + 3.76N_2) \rightarrow$$

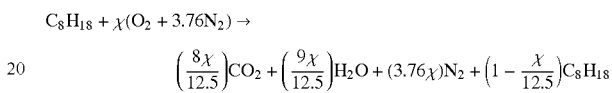

where $\chi = 12.5$ for complete stoichiometric combustion. It is assumed that there is no partial burning of octane during rich conditions, and that octane that is not combusted is simply present in the reactants as pure octane. It is also assumed that air composition is 80% Nitrogen and 20% Oxygen.

The heat produced during this reaction is derived from a heat balance equation of this reaction equation, assuming constant-volume specific heat capacity values of the constituent species. The temperature change due to combustion is approximated by calculating the change in temperature using an averaging of specific heat values for all substances involved (taken at a reasonable temperature of approx. 500 K). This model is representative enough of the dynamics involved in the combustion process and the assumptions do not adversely affect the results the fine details of the combustion process do not significantly affect the general behaviour of the system. For example, the modelling of dissociation of species such as carbon monoxide, hydrogen and nitrogen oxide would not significantly alter the macroscopic dynamics of the system.

Using this model, the following control functions are derived based on the drive-side torque acting against crankshaft rotation, the crankshaft angular velocity and the mass of oxygen in the cylinder (which could in practice be estimated using mass flow sensors):

$$\sigma_{\omega_c}(q_{\omega_c}) = f_{\omega_c} \cdot e^{(\xi_{\omega_c} q_{\omega_c})}$$

$$\sigma_{\tau_d}(q_{\tau_d}) = f_{\tau_d} \cdot e^{(\xi_{\tau_d} q_{\tau_d})}$$

$$\sigma_{m_{o_2}}(q_{m_{o_2}}) = f_{m_{o_2}} \cdot e^{(\xi_{m_{o_2}} q_{m_{o_2}})}$$

where:

$$q_{\omega_c} = \frac{\omega_c}{\omega_c + \mu_{\omega_c}}, \ q_{\tau_c} = \frac{\tau_d}{\tau_d + \mu_{\tau_d}}, \ q_{m_{o_2}} = \frac{m_{o_2}}{m_{o_2} + \mu_{m_{o_2}}}$$

The control functions are then used to control the pressure of the air intake and the pressure of the fuel injection line as follows:

$$\dot{m}_f = C_f a_f (2P_{P_f}(\sigma_{m_{o_2}} P_f - P_{cyl}))^{\frac{1}{2}} \Psi_f +$$

-continued $$\frac{(M_f^P - M_f^R)}{1000}(8A_r^C + (18A_r^H))\Psi_C + C_f a_e \left(2\frac{m_f}{V}(P_{ex} - pp_f)\right)^{\frac{1}{2}}\Psi_E$$

$$\dot{m}_{o_2} = C_{o_2} a_a \left(2\rho_{o_2}(\sigma_{\tau_d}\sigma_{\omega_c} 0.2 P_a - P_{cyl})\right)^{\frac{1}{2}} \Psi_A +$$

$$\frac{(M_{o_2}^P - M_{o_2}^R)}{1000}(2A_r^O)\Psi_C + C_{o_2} a_e \left(2\frac{m_{o_2}}{V}(P_{ex} - pp_{o_2})\right)^{\frac{1}{2}}\Psi_E$$

$$\dot{m}_{n_2} = C_{n_2} a_a \left(2\rho_{n_2}(\sigma_{\tau_d}\sigma_{\omega_c} 0.8 P_a - P_{cyl})\right)^{\frac{1}{2}} \Psi_A +$$

$$\frac{(M_{n_2}^P - M_{n_2}^R)}{1000}(2A_r^N)\Psi_C + C_{n_2} a_e \left(2\frac{m_{n_2}}{V}(P_{ex} - pp_{n_2})\right)^{\frac{1}{2}}\Psi_E$$

In other words, the control function based on the mass of oxygen in the cylinder is used to control the pressure of the fuel injection line, while the control functions based on the drive-side torque acting against crankshaft rotation and the crankshaft angular velocity are used to control the pressure of the air intake.

Other control functions that could be used are as follows:

$$\sigma_{P_{ex}}(q_{P_{ex}}) = f_{P_{ex}} \cdot e^{(\xi_{P_{ex}} q_{P_{ex}})}$$

$$\sigma_{m_f}(q_{m_f}) = f_{m_f} \cdot e^{(\xi_{m_f} q_{m_f})}$$

$$\sigma_{t_A}(q_{t_A}) = f_{t_A} \cdot e^{(\xi_{t_A} q_{t_A})}$$

where:

$$q_{P_{ex}} = \frac{P_{ex}}{P_{ex} + \mu_{P_{ex}}}, \ q_{m_f} = \frac{m_f}{m_f + \mu_{m_f}}, \ q = \frac{t_A}{t_A + \mu_{t_A}}$$

The terms used in the above are as follows:

| | | |
|---|---|---|
| A | Crank-angle, [0, 4π) radians (four-stroke mechanism) | rad |
| $A_r^C$ | Relative atomic mass of carbon: 12.0107 | |
| $A_r^H$ | Relative atomic mass of hydrogen: 1.00784 | |
| $A_r^N$ | Relative atomic mass of nitrogen: 14.0067 | |
| $A_r^O$ | Relative atomic mass of oxygen: 15.9994 | |
| $a_a$ | Area of the air-inlet orifice: $\pi 0.0075^2$ | $m^2$ |
| $a_e$ | Area of the exhaust orifice: $\pi 0.0075^2$ | $m^2$ |
| $a_f$ | Area of the fuel-injector orifice: $\pi 0.001^2$ | $m^2$ |
| C and d | subscripts denote either crankshaft or drive-side | |
| $c_v^{avg}$ | "Average" specific heat (assuming specific heat values for substances at ~500 K) | $J\ mol^{-1} K^{-1}$ |
| $B_\theta$ | Damping coefficient | $Nm\ rad^{-1}\ sec^{-1}$ |
| $C_f$ | Orifice coefficient of flow for octane, set to 1 for simplification | |
| $C_{o_2}$ | Orifice coefficient of flow for oxygen, set to 1 for simplification | |
| $C_{n_2}$ | Orifice coefficient of flow for nitrogen, set to 1 for simplification | |
| $C_{co_2}$ | Orifice coefficient of flow for carbon dioxide, set to 1 for simplification | |
| $C_{h_2o}$ | Orifice coefficient of flow for water, set to 1 for simplification | |
| $\phi_c$ and $\phi_d$ | Coefficients of friction. 0.05 and 0.1 respectively | |
| dH | Enthalpy of octane combustion (assume typical enthalpy of formation values) | $J\ mol^{-1}$ |
| dTemp | Approx. temperature change due to combustion (assume $c_v^{avg}$): dTemp = dH/$c_v^{avg}$ | K |
| F | Force exerted on cylinder head due to the pressure of gasses in the cylinder cavity | N |
| $F_1$ | Force transmitted down crank rod. Accounts for cylinder/rod bearing interface | N |
| $F_c$ | Force exerted on crankshaft. Translation of $F_1$ to tangent of crankshaft surface | N |
| $I_c$ and $I_d$ | inertia of the crank and drive-shaft respectively | $kg\ m^2$ |
| $K_\theta$ | Stiffness constant of the drive-train assembly | $Nm\ rad^{-1}$ |
| l | Length of the cylinder connecting rod: 0.25 | m |
| $m_f$ | Mass of fuel (octane) | kg |
| $m_{o_2}$ | Mass of oxygen | kg |
| $m_{n_2}$ | Mass of nitrogen | kg |
| $m_{h_2o}$ | Mass of water | kg |
| $m_{co_2}$ | Mass of carbon dioxide | kg |
| $M_f^P$ | Number of moles of octane in reaction products | mol |
| $M_f^R$ | Number of moles of octane in reaction reactants | mol |
| $M_{o_2}^P$ | Number of moles of oxygen in reaction products | mol |
| $M_{o_2}^R$ | Number of moles of oxygen in reaction reactants | mol |
| $M_{n_2}^P$ | Number of moles of nitrogen in reaction products | mol |
| $M_{n_2}^P$ | Number of moles of nitrogen in reaction products | mol |
| $M_{n_2}^R$ | Number of moles of nitrogen in reaction reactants | mol |
| $M_{h_2o}^P$ | Number of moles of water in reaction products | mol |
| $M_{h_2o}^R$ | Number of moles of water in reaction reactants | mol |
| $M_{CO_2}^P$ | Number of moles of carbon dioxide in reaction product | mol |
| $M_{CO_2}^R$ | Number of moles of carbon dioxide in reaction reactants | mol |
| N | Gearing of the drivetrain: Scalar value | |
| $\Omega_{eng}$ | Engine power output | W |
| $P_a$ | Pressure of the air intake | Pa |
| $P_{cyl}$ | Pressure in cylinder cavity (During combustion, $\Delta P_{cyl}$ calculated using dTemp) | Pa |
| $P_{ex}$ | Pressure of the exhaust chamber | Pa |
| $P_f$ | Pressure of the fuel injection line | Pa |
| $pp_f$ | Partial pressure of octane | Pa |
| $pp_{o_2}$ | Partial pressure of oxygen | Pa |
| $pp_{n_2}$ | Partial pressure of nitrogen | Pa |
| $pp_{co_2}$ | Partial pressure of carbon dioxide | Pa |
| $pp_{h_2o}$ | Partial pressure of gaseous water | Pa |
| $\omega_c$ and $\omega_d$ | Angular velocity of the crank and drive-side respectively | $rad\ s^{-1}$ |
| $\rho_f$ | Fuel (octane) density, taken here to be a constant 745 | $kg\ m^{-3}$ |
| $\rho_{o_2}$ | Atmospheric oxygen density, taken here to be a constant 1.43 | $kg\ m^{-3}$ |
| $\rho_{n_2}$ | Atmospheric nitrogen density, taken here to be a constant 1.251 | $kg\ m^{-3}$ |
| $\rho_{CO_2}$ | Carbon dioxide density | $kg\ m^{-3}$ |
| $\rho_{h_2o}$ | Water density | $kg\ m^{-3}$ |
| $r_{cyl}$ | Radius of cylinder head: 0.05 | m |

| | | |
|---|---|---|
| r | radius of the crank arm: 0.05 | m |
| ψ$_A$ | Boolean function, 1 if cylinder is in the air-intake phase, zero otherwise | |
| ψ$_C$ | Boolean function, 1 if cylinder is in the combustion phase, zero otherwise | |
| ψ$_E$ | Boolean function, 1 if cylinder is in the exhaust phase, zero otherwise | |
| ψ$_F$ | Boolean function, 1 if cylinder is in the injection phase, zero otherwise | |
| T$_p$ | Engine power time constant | s |
| τ$_c$ | Crank torque | Nm |
| τ$_d$ | Drive-side (Drive-shaft) torque acting against crankshaft rotation | Nm |
| θ | Drive-train torsion | rad |
| V | Volume of cylinder cavity (varies with cylinder position) | m$^3$ |

Figure 24:
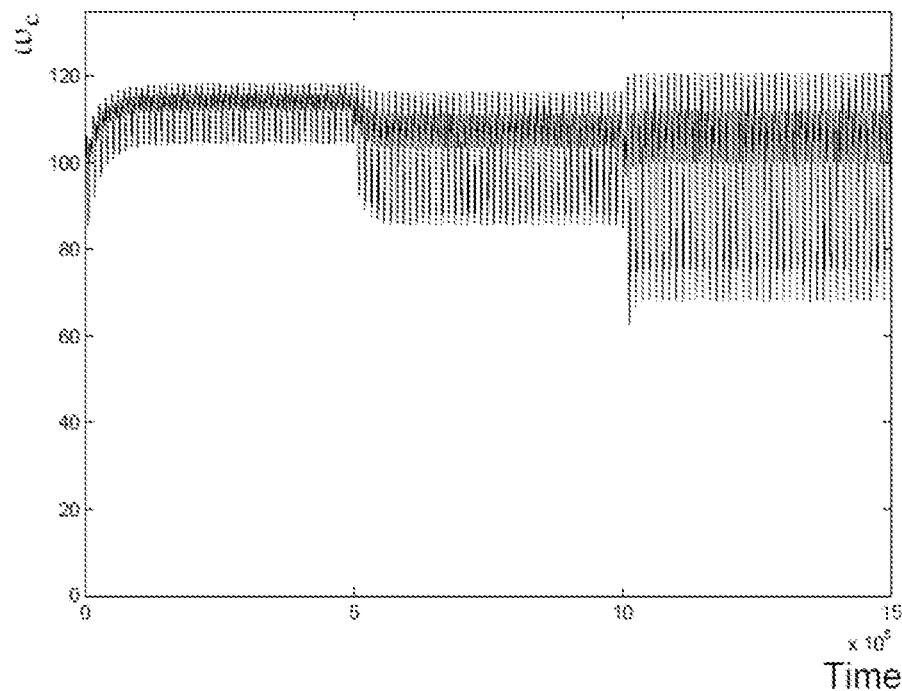
FIG. 24 shows the change over time of angular velocity of the crankshaft of the internal combustion of the invention.
Figure 25:
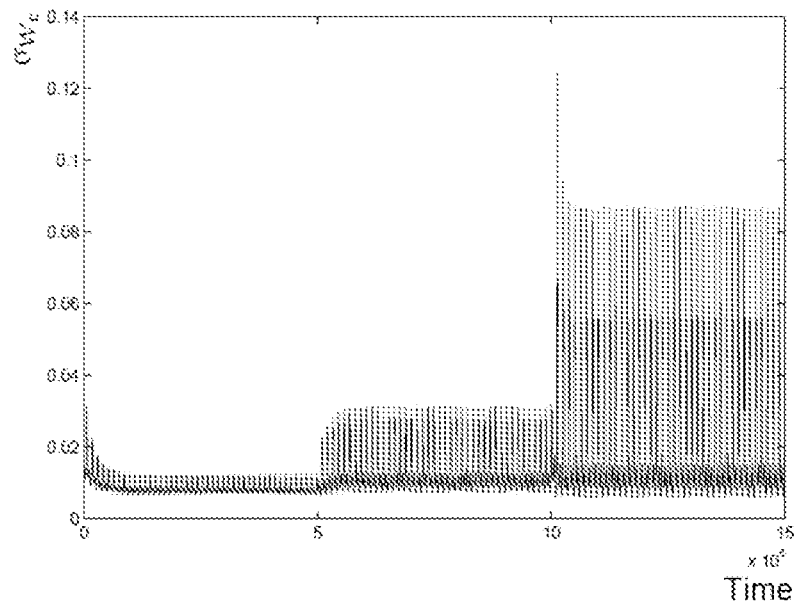
FIG. 25 shows the change over time of the control function based on the angular velocity of the crankshaft of the internal combustion of the invention.
Figure 26:
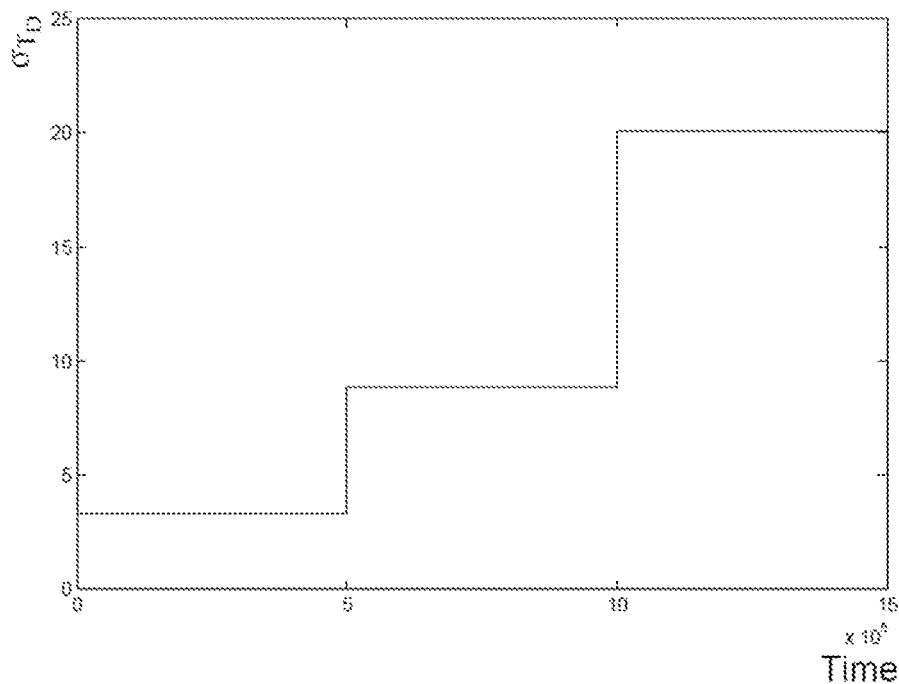
FIG. 26 shows the change over time of the control function based on the torque of the cylinder against the rotation of the crankshaft of the internal combustion of the invention.
Figure 27:
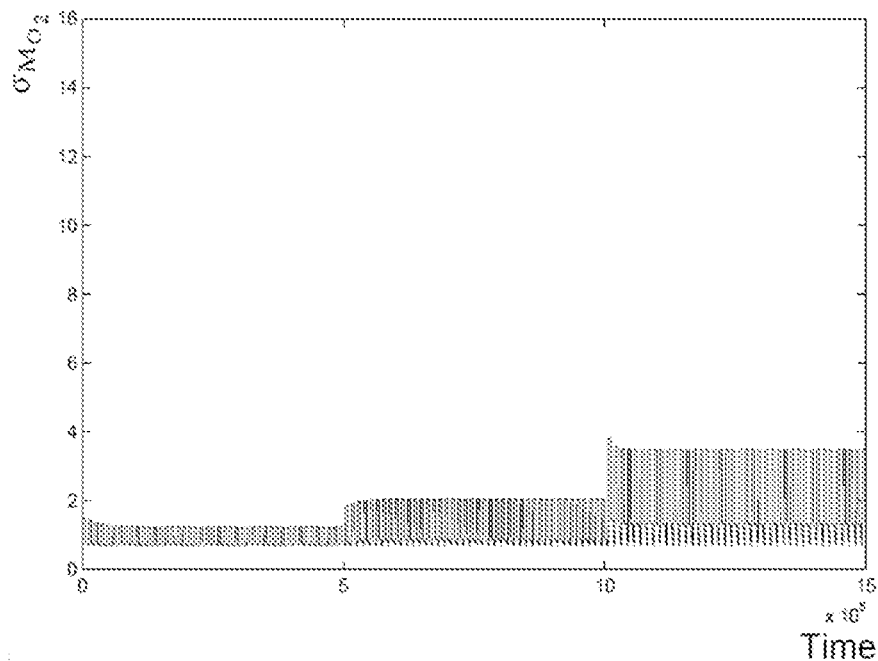
FIG. 27 shows the change over time of the control function based on the mass of oxygen in the cylinder of the internal combustion of the invention.

The crankshaft angular velocity of the engine controlled in the embodiment is shown in FIG. 24, where the external torque demand on the system is increased substantially at times 5×10$^5$ and 10×10$^5$. Instead of stalling, it can be seen that the control functions adjust the fuel and air injection pressures to maintain a stable system. The variations of the control functions over time are shown in FIGS. 25 to 27.

The skilled person will appreciate that in other embodiments each cylinder of the engine could be controlled using a different set of control functions to control different parameters of the cylinder.

Whilst the present invention has been described and illustrated with reference to particular embodiments, it will be appreciated by those of ordinary skill in the art that the invention lends itself to many different variations not specifically illustrated herein. In particular, it will be appreciated that the invention will have application to chaotic system found in many different areas of technology. By way of example only, certain possible variations will now be described.

The invention claimed is:

1. A method of controlling an internal combustion engine, the system comprising a plurality of variable quantities, the method comprising the steps of:
    obtaining a model of the internal combustion engine, the model comprising a plurality of variables representing a plurality of variable quantities of the internal combustion engine, and a plurality of respective rate equations that describe the rate of change of the variables;
    identifying a control term in at least one rate equation from the plurality of rate equations;
    deriving a rate control function from, for at least one of the variables in the rate equation, the proportion of the variable to the growth rate of the rate equation;
    applying the rate control function to the control term to provide a stabilised control term; and
    controlling the internal combustion engine by modifying at least one of the quantities represented by the variables in the control term, so that the control term derived from the modified quantities is substantially the same as the stabilised control term.

2. A method as claimed in claim 1, wherein the control term includes the variable whose behaviour is described by the rate equation.

3. A method as claimed in claim 1, wherein the proportion q$_x$ of a variable x to the growth rate is given by the equation:

$$q_x = \frac{x}{x + \mu_x}$$

where μ$_x$ is a constant.

4. A method as claimed in claim 1, wherein the rate control function is of the form:

$$fe^{\xi q_{x1} \cdots q_{xn}}$$

where q$_{x1}$ to q$_{xn}$ are the proportions of the variables x1 to xn to the growth rate, and f and ξ are scalars.

5. A method as claimed in claim 4, where f and ξ are varied so as to stabilise the internal combustion engine into a pre-determined orbit.

6. A method as claimed in claim 1, wherein the at least one rate equation describes exponential growth of its respective variable.

7. A method as claimed in claim 1, wherein the control term contributes to the growth of the respective variable of the at least one rate equation.

8. The method of claim 1, the step of controlling including controlling pressure of air intake of a cylinder of the internal combustion engine.

9. The method of claim 1, the control term being crankshaft angular velocity of the internal combustion engine.

10. The method of claim 1, the step of controlling including controlling pressure of a fuel injection line of a cylinder of the internal combustion engine.

11. The method of claim 10, the control term being mass of oxygen in the cylinder.

12. The method of claim 1, the step of controlling including controlling at least two cylinders of the internal combustion engine.

13. The method of claim 12, the at least two cylinders being controlled using different control terms.

14. A internal combustion engine comprising a plurality of variable quantities, controlled according to a method comprising the steps of:
    obtaining a model of the internal combustion engine, the model comprising a plurality of variables representing the variable quantities, and a plurality of respective rate equations that describe the rate of change of the variables;
    identifying a control term in at least one rate equation from the plurality of rate equations;
    deriving a rate control function from, for at least one of the variables in the rate equation, the proportion of the variable to the growth rate of the rate equation;
    applying the rate control function to the control term to provide a stabilised control term; and
    controlling the internal combustion engine by modifying at least one of the quantities represented by the variables in the control term, so that the control term derived from the modified quantities is substantially the same as the stabilised control term.

15. The internal combustion engine of claim 14, the control term including the variable whose behaviour is described by the rate equation.

16. The internal combustion engine of claim 14, the proportion $q_x$ of a variable x to the growth rate is given by the equation:

$$q_x = \frac{x}{x + \mu_x}$$

where $\mu_x$ is a constant.

17. The internal combustion engine of claim 14, the rate control function being of the form:

$$f e^{\xi q_{x1} \cdots q_{xn}}$$

where $q_{x1}$ to $q_{xn}$ are the proportions of the variables x1 to xn to the growth rate, and f and are scalars.

18. The internal combustion system of claim 17, where f and $\xi$ are varied so as to stabilise the internal combustion engine into a pre-determined orbit.

19. The internal combustion engine of claim 14, the at least one rate equation describing exponential growth of its respective variable.

20. The internal combustion engine of claim 14, the control term contributing to the growth of the respective variable of the at least one rate equation.

21. The internal combustion engine of claim 14, the step of controlling including controlling pressure of air intake of a cylinder of the internal combustion engine.

22. The internal combustion engine of claim 14, the control term being crankshaft angular velocity of the internal combustion engine.

23. The internal combustion engine of claim 14, the step of controlling including controlling pressure of a fuel injection line of a cylinder of the internal combustion engine.

24. The internal combustion engine of claim 23, the control term being mass of oxygen in the cylinder.

25. The internal combustion engine of claim 14, the step of controlling including controlling at least two cylinders of the internal combustion engine.

26. The internal combustion engine of claim 25, the at least two cylinders being controlled using different control terms

* * * * *